United States Patent
Ouchi et al.

(10) Patent No.: US 10,925,006 B2
(45) Date of Patent: Feb. 16, 2021

(54) TERMINAL APPARATUS AND METHOD

(71) Applicants: Sharp Kabushiki Kaisha, Sakai (JP); FG Innovation Company Limited, Tuen Mun (HK)

(72) Inventors: Wataru Ouchi, Sakai (JP); Shoichi Suzuki, Sakai (JP); Tomoki Yoshimura, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 10 days.

(21) Appl. No.: 16/482,274

(22) PCT Filed: Feb. 1, 2018

(86) PCT No.: PCT/JP2018/003389
§ 371 (c)(1),
(2) Date: Jul. 31, 2019

(87) PCT Pub. No.: WO2018/143332
PCT Pub. Date: Aug. 9, 2018

(65) Prior Publication Data
US 2019/0373560 A1    Dec. 5, 2019

(30) Foreign Application Priority Data
Feb. 3, 2017    (JP) ................................ 2017-018543

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0082* (2013.01); *H04W 72/042* (2013.01); *H04W 72/0446* (2013.01); *H04W 80/08* (2013.01)

(58) Field of Classification Search
CPC ............. H04W 52/146; H04W 72/042; H04W 72/0446; H04W 80/08; H04L 5/0082
See application file for complete search history.

(56) References Cited

U.S. PATENT DOCUMENTS

| | | | | |
|---|---|---|---|---|
| 2012/0082125 A1* | 4/2012 | Huang | ................ | H04W 72/042 370/329 |
| 2012/0230239 A1* | 9/2012 | Park | ..................... | H04W 72/00 370/311 |
| 2013/0051355 A1* | 2/2013 | Hong | .................... | H04L 5/0094 370/329 |

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.

* cited by examiner

*Primary Examiner* — Brenda H Pham
(74) *Attorney, Agent, or Firm* — Keating & Bennett, LLP

(57) ABSTRACT

Included is an uplink power control unit configured not to apply a first correction value obtained from a TPC command included in a first DCI format to transmit power for a PUSCH and applies a second correction value obtained from a TPC command included in a second DCI format to transmit power for an sPUSCH, in a case that a subframe m is later than a subframe n, that a subframe m+B for transmitting the sPUSCH is earlier than a subframe n+A for transmitting the PUSCH, and that a transmission subframe for the PUSCH and a transmission subframe for the
(Continued)

sPUSCH belong to an identical uplink power control subframe set in a first serving cell.

8 Claims, 6 Drawing Sheets

(51) Int. Cl.
*H04W 72/04* (2009.01)
*H04W 80/08* (2009.01)

FIG. 3A

| UL/DL configuration | Subframe i | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 subframes | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 3B

| UL/DL configuration | Subframe i | | | | | | | | | | | | | | | | | | | |
|---|---|---|---|---|---|---|---|---|---|---|---|---|---|---|---|---|---|---|---|---|
| | \multicolumn{20}{c}{sTTIx} | | | | | | | | | | | | | | | | | | | |
| | 0 | 1 | 2 | 3 | 4 | 5 | 6 | 7 | 8 | 9 | 10 | 11 | 12 | 13 | 14 | 15 | 16 | 17 | 18 | 19 |
| 0 | - | - | - | - | 4 sTTIs | | 5 | 5 | 6 | 6 | - | - | - | - | 4 | 4 | 5 | 5 | 6 | 6 |
| 1 | - | - | - | - | 4 | 4 | 5 | 5 | 6 | - | - | - | - | - | 4 | 4 | 5 | 5 | - | - |
| 2 | - | - | - | - | 4 | 4 | - | - | - | - | - | - | - | - | 4 | - | - | - | - | - |
| 3 | - | - | - | - | 4 | 4 | 5 | 5 | 6 | - | - | - | - | - | 4 | - | - | - | - | - |
| 4 | - | - | - | - | 4 | 4 | 5 | - | - | - | - | - | - | - | 4 | - | - | - | - | - |
| 5 | - | - | - | - | 4 | 4 | - | - | - | - | - | - | - | - | - | - | - | - | - | - |
| 6 | - | - | - | - | 4 | 4 | 5 | 5 | 6 | - | - | - | - | - | 4 | 5 | 5 | - | - | - |

TERMINAL APPARATUS AND METHOD

Technical Field

Embodiments of the present invention relate to a technique of a terminal apparatus and a method that enable efficient communication.

This application claims priority based on JP 2017-018543 filed on Feb. 3, 2017, the contents of which are incorporated herein by reference.

BACKGROUND ART

The 3rd Generation Partnership Project (3GPP), which is a standardization project, has standardized the Evolved Universal Terrestrial Radio Access (EUTRA), in which high-speed communication is achieved by adopting an Orthogonal Frequency-Division Multiplexing (OFDM) communication scheme and flexible scheduling on a given frequency and time basis called a resource block. Some communications using standardized techniques of EUTRA are also collectively referred to as Long Term Evolution (LTE) communication.

Moreover, the 3GPP discusses Advanced E-UTRA (A-EUTRA), which realizes higher-speed data transmission and has upper compatibility with E-UTRA. E-UTRA is a communication system based on a network in which base station apparatuses have substantially the same cell configuration (cell size); however, as for A-EUTRA, discussion is made on a communication system based on a network in which base station apparatuses (cells) having different configurations coexist in the same area (different-type radio network, heterogeneous network).

Furthermore, techniques for reducing processing time related to communications are studied (NPL 1).

CITATION LIST

Non Patent Literature

NPL 1: "3GPP TR36.881v. 0.5.0 (2015-11)", R2-157181, 4 Dec. 2015.

SUMMARY OF INVENTION

Technical Problem

Conventional transmit power control or transmission control may fail to achieve efficient communications of a communication apparatus (a terminal apparatus and/or a base station apparatus).

An aspect of the present invention has been made in view of the above-described respects, and an object of the present invention is to provide a terminal apparatus and a method that enable efficient control of transmit power control for achieving efficient communications.

Solution to Problem (1) In order to accomplish the object described above, an aspect of the present invention is contrived to provide the following measures. Specifically, a terminal apparatus according to an aspect of the present invention is a terminal apparatus for communicating with a base station apparatus, the terminal apparatus including: a receiver configured to receive a Downlink Control Information (DCI) format including a Transmission Power Control (TPC) command; a transmitter configured to transmit, in a case that a first DCI format is detected in a subframe n, a Physical Uplink Shared Channel (PUSCH) corresponding to the first DCI format in a subframe n+A, and transmits, in a case that a second DCI format is detected in a subframe m, a shortened PUSCH (sPUSCH) corresponding to the second DCI format in a subframe m+B, the B being a smaller value than the A; and an uplink power control unit configured not to apply a first correction value obtained from the TPC command included in the first DCI format to transmit power for the PUSCH and to apply a second correction value obtained from the TPC command included in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

(2) A method according to an aspect of the present invention is a method in a terminal apparatus for communicating with a base station apparatus, the method including the steps of: receiving a Downlink Control Information (DCI) format including a Transmission Power Control (TPC) command; transmitting, in a case that a first DCI format is detected in a subframe n, a Physical Uplink Shared Channel (PUSCH) corresponding to the first DCI format in a subframe n+A; transmitting, in a case that a second DCI format is detected in a subframe m, a shortened PUSCH (sPUSCH) corresponding to the second DCI format in a subframe m+B, the B being a smaller value than the A; and not applying a first correction value obtained from the TPC command included in the first DCI format to transmit power for the PUSCH and applying a second correction value obtained from the TPC command in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

Advantageous Effects of Invention

An aspect of the present invention allows transmission efficiency to be improved in a radio communication system in which a base station apparatus and a terminal apparatus communicate.

BRIEF DESCRIPTION OF DRAWINGS

FIG. 3 is a diagram illustrating a value of KPUSCH corresponding to each uplink subframe of a TDD UL/DL configuration according to the first embodiment.

DESCRIPTION OF EMBODIMENTS

First Embodiment

Figure 1:
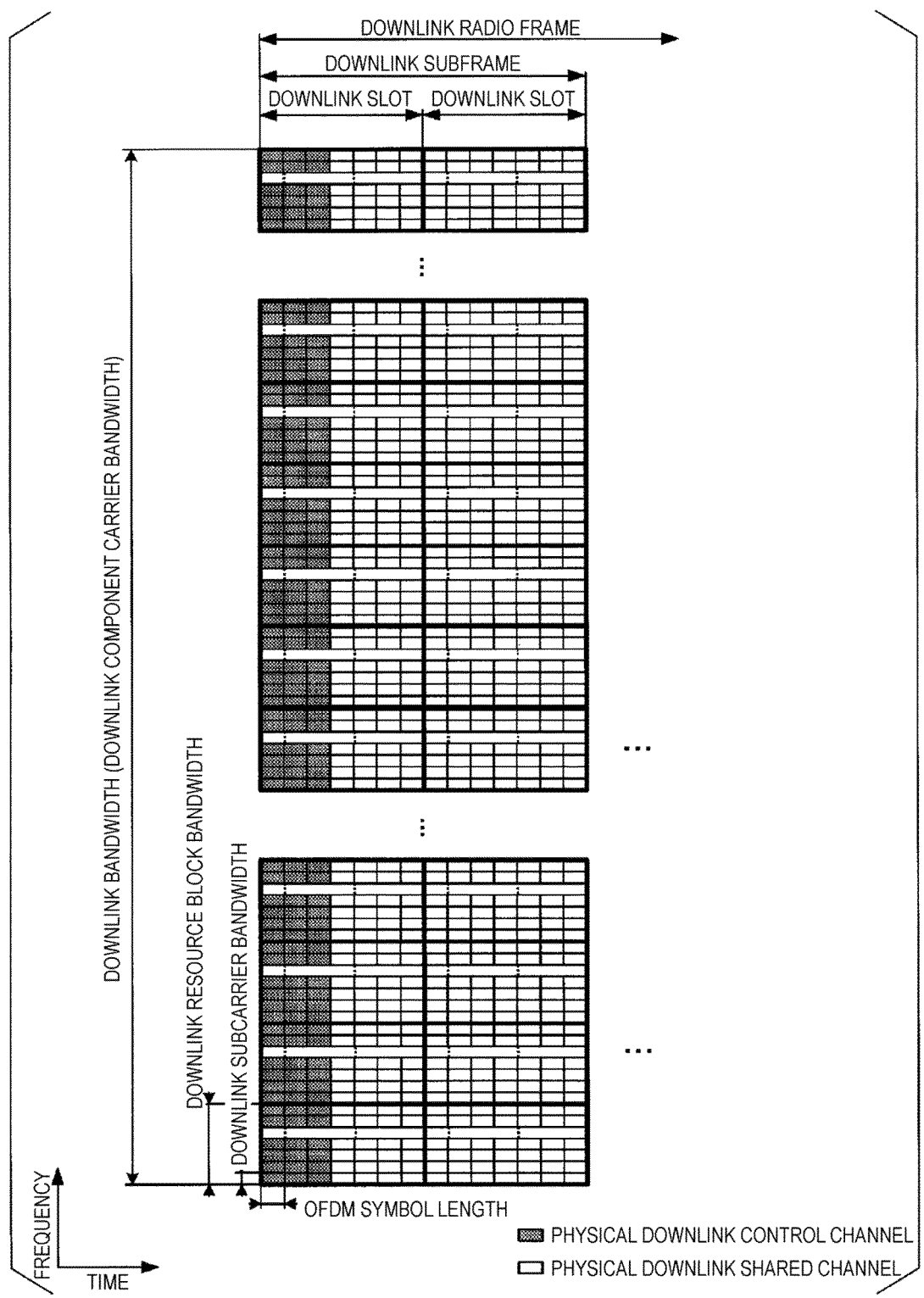
FIG. 1 is a diagram illustrating an example of a downlink radio frame structure according to a first embodiment.

A first embodiment of the present invention will be described below. A description is given based on a communication system in which a base station apparatus and a terminal apparatus communicate in one or a plurality of cells. The base station apparatus may be referred to as node B, EUTRAN NodeB/evolved NodeB (eNB), or Transmission and/or Reception Point (TRP). The terminal apparatus may be referred to as a mobile station device, a user device, and User equipment (UE).

Physical channels, physical signals, and a frame structure according to the present embodiment will be described. Here, the channel refers to a medium used for transmission (propagation, sending) of a signal. The physical channel refers to a physical medium used to transmit a signal. In the present embodiment, the physical channel may be used synonymously with a physical signal. In the future LTE, the physical channel may be added or its structure/configuration and format may be changed or added; however, the description of the present embodiment will not be affected by a change in or addition to a known physical channel configuration.

Frame structure types according to the present embodiment will be described. Note that the frame structure type may be associated with a duplex mode. The duplex is a scheme for exchanging information between two points (e.g., between the base station apparatus and the terminal apparatus). The duplex is also referred to as bi-directional communications. The duplex mode includes Frequency Division Duplex (FDD) and Time Division Duplex (TDD).

The FDD enables communications to be simultaneously performed by using different frequencies in the downlink and the uplink. The TDD enables communications by using the same frequency in the downlink and the uplink.

Frame structure Type 1 (FS1) is applied to FDD. Thus, FS1 is applied to a cell operation that supports FDD. FS1 can be applied to both Full Duplex-FDD (FD-FDD) and Half Duplex-FDD (HD-FDD).

In FDD, the downlink transmission and the uplink transmission use respective non-overlapping frequency domains. In other words, a frequency domain is defined for each of the downlink transmission and the uplink transmission. In other words, different carrier frequencies are applied to the downlink transmission and to the uplink transmission. Here, the frequency domain including the carrier frequency (center frequency) used for the downlink transmission and/or the uplink transmission may be referred to as an operating band.

In FDD, 10 subframes are available for each of the downlink transmission and the uplink transmission.

In FDD, the operating band for downlink transmission and uplink transmission may be associated with a single index. In other words, the frequency domain used for the downlink transmission and the frequency domain used for the uplink transmission may be determined by selecting a single index.

In the HD-FDD operation, the terminal apparatus is not capable of concurrently performing both transmission and reception, but in the FD-FDD operation, the terminal apparatus can concurrently perform transmission and reception.

There are two types of HD-FDD. For HD-FDD operation type A, a guard period is generated by the terminal apparatus by not receiving the last portion (last symbol) of the downlink subframe immediately before the uplink subframe from the same terminal apparatus.

For HD-FDD operation type B, a guard period, referred to as an HD guard subframe, is generated by the terminal apparatus by not receiving the downlink subframe immediately before the uplink subframe from the same terminal apparatus and by not receiving the downlink subframe immediately after the uplink subframe from the same terminal apparatus. In other words, in the HD-FDD operation, the terminal apparatus generates the guard period by controlling reception processing for the downlink subframe. Note that the symbol may include either an OFDM symbol or an SC-FDMA symbol.

Frame structure Type 2 (FS2) is applied to TDD. Specifically, FS2 is applied to a cell operation that supports TDD. Furthermore, each radio frame includes two half-frames. Each half-frame includes five subframes. The UL-DL configuration in a given cell may be changed between radio frames. Control of subframes in uplink or downlink transmission may be performed in the most recent radio frame. The terminal apparatus can acquire UL-DL configuration in the most recent radio frame via PDCCH/EPDCCH or higher layer signaling. Note that the UL-DL configuration or the UL/DL configuration (TDD UL/DL configuration) indicates the configuration of the uplink subframe, the downlink subframe, and the special subframe in TDD. UL/DL configuration may be referred to as subframe assignment. The special subframe includes a Downlink Pilot Time Slot (DwPTS), a guard period (GP), and an Uplink Pilot Time Slot (UpPTS) that allows uplink transmission. The configuration of DwPTS and UpPTS in the special subframe is managed in a table, and the terminal apparatus can acquire the configuration through higher layer signaling. Note that the special subframe serves as a switching point from the downlink to the uplink. In other words, at the switching point, the terminal apparatus transitions from reception to transmission, and the base station apparatus transitions from transmission to reception. The switching point is 5 ms cycle or 10 ms cycle. In a case that the switching point is the 5 ms cycle, the special subframe is present in both half-frames. In a case that the switching point is the 10 ms cycle, the special subframe is only present in the first half-frame.

In a case that two symbols are allocated to UpPTS, the SRS and PRACH preamble format 4 may be mapped.

In TDD, a TDD enhanced Interference Management and Traffic Adaptation (eIMTA) technology based on the amount of communications (traffic amount) and interference of each cell. The eITMA is a technique of achieving optimum communications by changing a ratio between the downlink subframe and the uplink subframe in a radio frame (that is, in 10 subframes) by dynamically switching the TDD configuration (by using L1 level or L1 signaling).

FS1 and FS2 employ Normal Cyclic Prefix (NCP) and Extended Cyclic Prefix (ECP).

Frame structure type 3 (FS3) is applied to a Licensed Assisted Access (LAA) secondary cell operation. Additionally, only NCP may be applied to FS3. The 10 subframes included in the radio frame is used for downlink transmission. The terminal apparatus processes the subframe as an empty subframe, without assuming that any signal is present in a subframe unless specified or unless a downlink transmission is detected in the subframe. The downlink transmission occupies one or more consecutive subframes. The consecutive subframes may include the first subframe and the last subframe. That is, the consecutive subframes may include at least two subframes. The consecutive subframes may include one or more subframes contiguous in the time domain. The first subframe starts at any symbol or slot in the subframe (e.g., OFDM symbol #0 or #7). The last subframe is occupied by a full subframe (14 OFDM symbols) or by OFDM symbols indicated based on one DwPTS period (thus, the symbols allocated to DwPTS). Note that, the terminal apparatus is notified of whether a subframe that is one of the consecutive subframes is the last subframe, through a certain field (or DCI) included in the DCI format. The field may further indicate a subframe in which the field is detected, or the number of OFDM symbols used in the next subframe. Additionally, in FS3, before the base station apparatus and the terminal apparatus perform related downlink/uplink transmission, a channel access procedure related to the Listen Before Talk (LBT) is performed. In other words, in the channel access procedure, the base station apparatus and/or the terminal apparatus at the transmission side can perform transmission in a case that the transmission side determines that the channel to be used for transmission is clear. Note that an LAA secondary cell may be referred to as an LAA cell.

Note that FS3 may support uplink transmission. The uplink transmission may occupy one or a plurality of consecutive subframes. At this time, the terminal apparatus supporting only the downlink transmission in the LAA cell and the terminal apparatus supporting the downlink transmission and the uplink transmission in the LAA cell may each transmit its capability information to notify the communication method that the terminal apparatus supports.

The terminal apparatus and the base station apparatus supporting FS3 may perform communication in an unlicensed frequency band.

The operating bands corresponding to an LAA or FS3 cell may be managed together with EUTRA operating band tables. For example, the EUTRA operating band indices may be numbered 1 to 44 to be managed and the operating band index corresponding to LAA (or LAA frequency) may be numbered 46 to be managed. For example, in the index 46, only the downlink frequency band may be defined. In some indices, the uplink frequency band may be reserved or secured in advance to be defined in the future. In addition, the duplex mode that corresponds to the operating band corresponding to the LAA or FS3 cell may be TDD. The frequency at which the LAA operation can be implemented is preferably 5 GHz or higher, but may be lower than 5 GHz. Thus, communications with the LAA operation may be performed at a frequency associated as an operating band corresponding to the LAA.

Next, downlink and uplink radio frame structures according to the present embodiment will be described.

FIG. 1 is a diagram illustrating an example of a downlink radio frame structure according to the present embodiment. In the downlink, an OFDM access scheme is used.

The following downlink physical channels are used for downlink radio communication from the base station apparatus to the terminal apparatus. Here, the downlink physical channels are used to transmit the information output from the higher layers.
Physical Broadcast CHannel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
short/shorter/shortened Physical Downlink Control Channel, PDCCH for sTTI (sPDCCH)
Physical Downlink Shared Channel (PDSCH)
short/shorter/shortened Physical Downlink Shared Channel, PDSCH for sTTI (sPDSCH)
Physical Multicast Channel (PMCH)

The following downlink physical signals are used in the downlink radio communication. Here, the downlink physical signals are not used to transmit the information output from the higher layers but is used by the physical layer.
Synchronization Signal (SS)
Downlink Reference Signal (DL RS)
DS (Discovery Signal)

According to the present embodiment, the following five types of downlink reference signals are used.
Cell-specific Reference Signal (CRS)
UE-specific Reference Signal (URS) relating to the PDSCH
Demodulation Reference Signal (DMRS) relating to the EPDCCH
Non-Zero Power Channel State Information—Reference Signal (NZP CSI-RS)
Zero Power Channel State Information—Reference Signal (ZP CSI-RS)
Multimedia Broadcast and Multicast Service over Single Frequency Network Reference signal (MBSFN RS)
Positioning Reference Signal (PRS)

A downlink radio frame includes a downlink Resource Block (RB) pair. This downlink RB pair is a unit for allocation of a downlink radio resource and the like and includes the frequency domain of a predefined width (RB bandwidth, for example) and the time domain (two slots=1 subframe, for example). Each of the downlink RB pairs includes two downlink RBs (RB bandwidth×slot) that are contiguous in the time domain. Each of the downlink RBs includes 12 subcarriers in the frequency domain. In the time domain, the downlink RB includes seven OFDM symbols in a case that NCP is added, and includes six OFDM symbols in a case that ECP with a longer CP length than NCP is added. A region defined by a single subcarrier in the frequency domain and a single OFDM symbol in the time domain is referred to as Resource Element (RE). PDCCH/EPDCCH is a physical channel in which a terminal apparatus identifier, PDSCH scheduling information, and PUSCH scheduling information, and downlink control information (DCI) such as modulation scheme, coding rate, and retransmission parameter are transmitted. Note that although a downlink subframe in a single Component Carrier (CC) is described here, a downlink subframe is defined for each CC and downlink subframes are approximately synchronized between the CCs. Here, "approximately synchronized between CC" means that in a case that the base station apparatus performs transmission by using a plurality of CCs, an error in transmission timing in each CC is within a predetermined range.

Although not illustrated, SS, PBCH, and DLRS may be mapped in downlink subframes. DLRS includes CRS transmitted by using the same antenna port (transmission port) as PDCCH, CSI-R used for measuring channel state information (CSI), UERS transmitted by using the same antenna port as some PDSCHs, and DMRS transmitted by using the same antenna port as EPDCCH. Moreover, DLRS may include RS mapped to a carrier to which no CRS is mapped. In this case, a signal similar to a signal corresponding to some antenna ports for the CRSs (e.g., only antenna port 0) or all the antenna ports for the CRSs (which is referred to as enhanced synchronization signal) can be inserted into some subframes (e.g., the first and sixth subframes in the radio frame) as time and/or frequency tracking signals. Here, the antenna port may be referred to as a transmission port. Here, the meaning of a term "physical channel/physical signal transmitted by an antenna port" includes a case that a physical channel/physical signal is transmitted by using a radio resource or layer corresponding to the antenna port. For example, the receiver is configured to receive a physical channel or a physical signal from a radio resource or layer corresponding to the antenna port.

Figure 2:
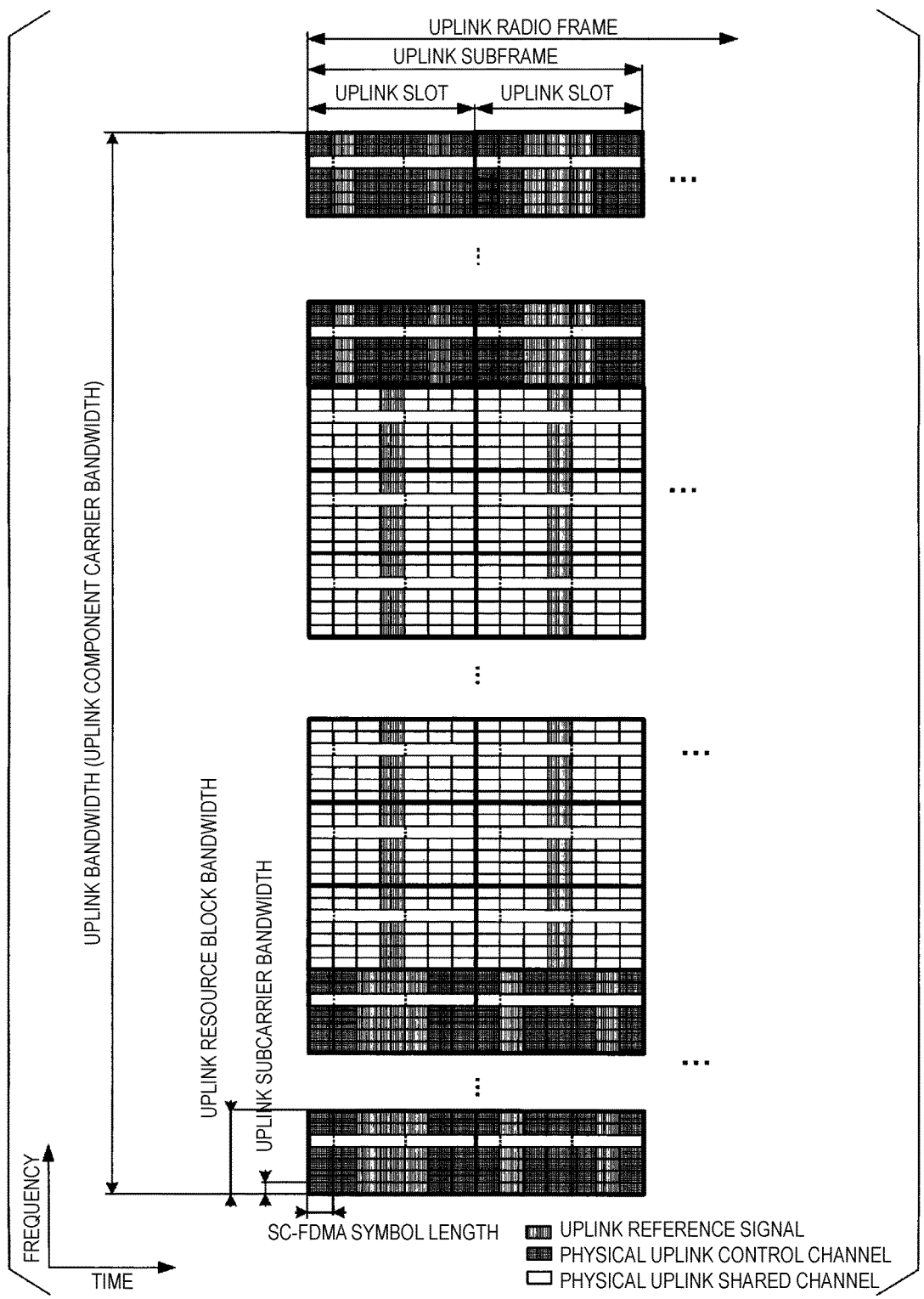
FIG. 2 is a diagram illustrating an example of an uplink radio frame structure according to the first embodiment.

FIG. 2 is a diagram illustrating an example of an uplink radio frame structure according to the present embodiment. An SC-FDMA scheme is used in the uplink.

In uplink radio communication from the terminal apparatus to the base station apparatus, the following uplink physical channels are used. Here, the uplink physical channels are used to transmit information output from the higher layers.

Physical Uplink Control Channel (PUCCH)
short/shorter/shortened Physical Uplink Control Channel, PUCCH for sTTI (sPUCCH)
Physical Uplink Shared Channel (PUSCH)
short/shorter/shortened Physical Uplink Shared Channel, PUSCH for sTTI (sPUSCH)
Physical Random Access Channel (PRACH)
short/shorter/shortened Physical Random Access Channel, PRACH for sTTI (sPRACH)

The following uplink physical signal is used for uplink radio communication. Here, the uplink physical signal is not used to transmit information output from the higher layers but is used by the physical layer.

Uplink reference signal (UL RS)
According to the present embodiment, the following two types of uplink reference signals are used.
Demodulation reference signal (DMRS)
Sounding reference signal (SRS)

In the uplink, PUSCH, PUCCH, and the like are allocated. Additionally, ULRS is allocated along with PUSCH and PUCCH. An uplink radio frame includes uplink RB pairs. This downlink RB pair is a unit for allocation of downlink radio resources and the like and includes the frequency domain of a predefined width (RB bandwidth) and the time domain (two slots=1 subframe). Each of the uplink RB pairs includes two uplink RBs (RB bandwidth×slot) that are contiguous in the time domain. Each of the uplink RB includes 12 subcarriers in the frequency domain. In the time domain, the downlink RB includes seven SC-FDMA symbols in a case that NCP is added, and includes six SC-FDMA symbols in a case that ECP is added. Note that although an uplink subframe in a single CC is described here, an uplink subframe may be defined for each CC.

The time unit $T_s$ of LTE is defined based on subcarrier spacing (e.g., 15 kHz) and FFT size (e.g., 2048). Specifically, $T_s$ is defined as $1/(15000 \times 2048)$ seconds. Note that the time length of a single slot is $15360 \times T_s$ (that is, 0.5 ms). The time length of a single subframe is $30720 \times T_s$ (that is, one millisecond). The time length of a single radio frame is $307200 \times T_s$ (that is, 10 ms). Note that in a case that the bandwidth is widened or the subcarrier spacing is changed, FFT size may vary as appropriate.

Scheduling of a physical channel or a physical signal is managed by using a radio frame. The time length of a single radio frame is 10 milliseconds (ms). A single radio frame includes 10 subframes. Furthermore, a single subframe includes two slots. Thus, the time length of the single subframe is 1 ms and the time length of a single slot is 0.5 ms. Moreover, scheduling is managed by using a resource block as a minimum unit of scheduling for allocating a physical channel. The resource block is defined by a given frequency domain including a set of multiple subcarriers (e.g., 12 subcarriers) on a frequency axis and a domain including a specific transmission time interval (TTI, slot, and symbol). Note that a single subframe may be referred to as a single resource block pair.

Additionally, a single TTI may be defined as a single subframe or the number of symbols constituting a single subframe. For example, in a case of NCP, a single TTI may include 14 symbols. In a case of ECP, a single TTI may include 12 symbols. Note that the TTI may be defined as a reception time interval on the receiving side. The TTI may be defined as a unit of transmission or reception of a physical channel or a physical signal. Thus, the time length of the physical channel or the physical signal may be defined based on the length of the TTI. Note that the symbol may include SC-FDMA symbol and/or OFDM symbol. The length of the TTI (TTI length) may be expressed by the number of symbols. The TTI length may be expressed by a length of time such as milliseconds (ms) or microseconds (us). Note that, in the same CP length and/or the same CP type, a TTI having a reduced number of symbols constituting one TTI (for example, less than 14 symbols in the NCP), or a TTI having a shorter TTI length than 1 ms-TTI may be referred to as a sTTI (short/shortened/shorter TTI).

A sequence according to a physical channel and/or a physical signal is mapped to each symbol. CP is added to the sequence according to the physical channel and/or the physical signal in order to improve accuracy of detection of the sequence.

The TTI length of the sTTI for the downlink transmission (DL-sTTI) may be configured to be either two symbols or seven symbols. The TTI length of the sTTI for the uplink transmission (UL-sTTI) may be configured to be any one of two symbols, three or four symbols, and seven symbols. SPDCCH and sPDSCH may be allocated in the DL-sTTI. Note that the TTI length of each of the uplink physical channels (for example, sPUSCH, sPUCCH, sPRACH) may be individually configured. Note that the TTI length of sPDSCH may include sPDCCH symbol or PDCCH symbol. The TTI length of sPUSCH and/or sPUCCH may include DMRS symbol or SRS symbol. The TTI length of the sTTI for the downlink transmission may be configured via higher layer signaling. The TTI length of the sTTI for the downlink transmission may be configured via system information. The TTI length of the sTTI for the uplink transmission may be configured via higher layer signaling. The TTI length of the sTTI for the uplink transmission may be configured based on a certain field in a DCI format.

FIG. 1 and FIG. 2 illustrate an example in which frequency-division multiplexing (FDM) and/or time division multiplexing (TDM) is performed on different physical channel/physical signals.

Note that, in a case that various physical channels and/or physical signals are transmitted for sTTI, each physical channel and/or physical signal may be referred to as sPDSCH, sPDCCH, sPUSCH, sPUCCH, or sPRACH.

Note that sPDSCH, sPDCCH, sPUSCH, sPUCCH, and sPRACH may each be defined as a short format or a different type for the corresponding physical channel (PDSCH, PDCCH, PUSCH, PUCCH, or PRACH). Note that PDSCH, PDCCH, PUSCH, PUCCH, and PRACH may each also be defined as a long format for the corresponding physical channel.

Note that sPDSCH, sPDCCH, sPUSCH, sPUCCH, and sPRACH may be configured to be transmitted in an MBSFN subframe based on a certain higher layer parameter. In other words, in a case that the downlink transmission and/or uplink transmission in the MBSFN subframe is configured based on the certain higher layer parameter, the terminal apparatus may monitor sPDCCH and sPDSCH in the MBSFN subframe and perform transmission of sPUSCH/sPUCCH/sPRACH.

In a case that a physical channel is transmitted for sTTI, the number of OFDM symbols and/or SC-FDMA symbols constituting the physical channel, or the number of OFDM symbols and/or SC-FDMA symbols used for transmission of the physical channel may be fewer than 14 symbols in the case of NCP (12 symbols in the case of ECP). The number of symbols used in a physical channel for sTTI may be configured by using the DCI and/or DCI format, or may be configured by using higher layer signaling. Not only the number of symbols used in the sTTI, but also the starting symbol in the time direction may be configured. Note that the unit of transmission with 14 symbols in the case of NCP (12 symbols in the case of ECP) may be referred to as TTI.

Note that sTTI may also be transmitted within a particular bandwidth in the system bandwidth. The bandwidth set for sTTI may be configured by using DCI and/or DCI format, or may be configured by using higher layer signaling (RRC signaling, MAC CE). The bandwidth may be set by using the start and end resource block indices or frequency positions, or may be configured by using a bandwidth and a start resource block index/frequency position. The bandwidth to which the sTTI is mapped may be referred to as an sTTI band. A physical channel mapped in the sTTI band may be referred to as a physical channel for sTTI. The physical channel for sTTI may include sPDSCH, sPDCCH, sPUSCH, sPUCCH, and sPRACH.

In a case that information/parameter used to define sTTI is configured by using DCI and/or DCI formats, the DCI and/or DCI formats may be scrambled with a predetermined RNTI, or Cyclic Redundancy Check (CRC) scrambled by a predetermined RNTI may be added to a bit sequence constituting the DCI format.

Here, the downlink physical channel and the downlink physical signal are also collectively referred to as a downlink signal. The uplink physical channel and the uplink physical signal are also collectively referred to as an uplink signal. The downlink physical channel and the uplink physical channel are collectively referred to as a physical channel. The downlink physical signal and the uplink physical signal are also collectively referred to as a physical signal.

PBCH is used for broadcasting a Master Information Block (MIB, a Broadcast CHannel (BCH)) that is commonly used by the terminal apparatuses.

The PCFICH is used for transmission of information for indicating a time domain (OFDM symbols) to be used for transmission of the PDCCH.

The PHICH is used for transmission of a HARQ indicator (HARQ feedback or response information) for indicating an ACKnowledgement (ACK) or a Negative ACKnowledgement (NACK) for the uplink data (UpLink Shared CHannel (UL-SCH)) received by the base station apparatus. In other words, the PHICH is a physical channel including information for indicating that detection (and/or decoding) of the PUSCH has succeeded or failed in the base station apparatus.

The PDCCH, the EPDCCH, and/or the sPDCCH are used for transmitting the Downlink Control Information (DCI). In the present embodiment, the PDCCH may include EPDCCH. The PDCCH may also include sPDCCH.

The sPDCCH may be PDCCH and/or EPDCCH in which mapping in the frequency domain and/or the time domain is restricted. The sPDCCH may have sPDSCH mapped to the same sTTI. The configuration related to sPDCCH may be configured via higher layer signaling. The configuration related to sPDCCH may be configured via system information. The configuration related to sPDCCH may be configured via a certain DCI format field included in PDCCH/EPDCCH.

Here, multiple DCI formats may be defined for DCI transmitted in PDCCH, EPDCCH, and/or sPDCCH. In other words, a field for DCI may be defined in a DCI format and mapped to information bits.

In a case that a physical channel for sTTI can be transmitted in a certain serving cell, that is, by a terminal apparatus and a base station apparatus in the certain serving cell, the terminal apparatus may monitor PDCCH/EPDCCH to which a DCI format including information/parameters, related to the sTTI configuration, is mapped. In other words, the base station apparatus may map, to PDCCH/EPDCCH, a DCI format including information/parameter related to sTTI configuration, for transmission to the terminal apparatus supporting transmission and/or reception of the physical channel using sTTI. Details of the DCI format will be described later.

The sPDSCH may be scheduled by using a first downlink grant detected in PDCCH and/or EPDCCH and a second downlink grant detected in the sPDCCH. The first downlink grant and the second downlink grant may both be scrambled by using a predetermined RNTI.

sPDSCH may be scheduled by using a single downlink grant (i.e., one piece of DCI, a single DCI format).

sPDSCH may be scheduled by using a two downlink grants (i.e., two pieces of DCI, two DCI formats).

Whether the scheduling is performed by using a single downlink grant or by using two downlink grants may be configured based on a higher layer parameter included in the system information or the higher layer signaling.

sPUSCH may be scheduled by using a single uplink grant (i.e., one piece of DCI, a single DCI format).

sPUSCH may be scheduled by using a two uplink grants (i.e., two pieces of DCI, two DCI formats).

Whether the scheduling is performed by using a single uplink grant or by using two uplink grants may be configured based on a higher layer parameter included in the system information or the higher layer signaling.

Based on DCI included in the first downlink grant detected in PDCCH and/or EPDCCH, the sPDCCH monitoring domain (or downlink sTTI band) may be configured for the sPDCCH. The sPDCCH monitoring domain may include information on the time domain for monitoring the sPDCCH. The sPDCCH monitoring domain may include information on the frequency domain for monitoring the sPDCCH.

The resource for sPUCCH may be determined according to DCI included in the second downlink grant detected in sPDCCH.

Here, the terminal apparatus may monitor a set of PDCCH candidates, EPDCCH candidates, and/or sPDCCH candidates. In the following description, the PDCCH may include the sPDCCH and/or the EPDDCH.

Here, the PDCCH candidates may be candidates of the PDCCH which may be allocated and/or transmitted by the base station apparatus. Furthermore, monitor may imply that the terminal apparatus attempts to decode each PDCCH in the set of PDCCH candidates in accordance with each of all the monitored DCI formats.

The set of PDCCH candidates to be monitored by the terminal apparatus is also referred to as a search space. The search space may include a Common Search Space (CSS). For example, the CSS may be defined as a search space common to multiple terminal apparatuses.

The search space may include a User equipment specific Search Space (USS). For example, the USS may be given at least based on a C-RNTI assigned to the terminal apparatus. The terminal apparatus may monitor the PDCCH in the CSS and/or USS to detect the PDCCH addressed to the terminal apparatus.

Furthermore, in addition to CSS, the search space may include a search space common to multiple terminal apparatuses. For example, this USS may be referred to as a terminal apparatus group search space (UEG-SS) or a cell common search space (CC-SS). The UEG-SS may be provided at least based on a RNTI common to multiple terminal apparatuses. The terminal apparatus may monitor the PDCCH in the UEG-SS to detect the PDCCH addressed to the terminal apparatus.

The terminal apparatus can acquire DCI included in the DCI format addressed to the terminal apparatus by detecting and decoding PDCCH addressed to the terminal apparatus.

In the CSS and/or the USS, the terminal apparatus in PUSCH transmission mode 1 can decode PDCCH with CRC scrambled by C-RNTI and can acquire a DCI format 0.

In the CSS and/or the USS, the terminal apparatus in PUSCH transmission mode 2 can decode PDCCH with CRC scrambled by C-RNTI and can acquire a DCI format 4.

In the CSS, the terminal apparatus can decode PDCCH with CRC scrambled by temporary C-RNTI and can acquire a DCI format 0. Note that PUSCH may be scheduled by using the DCI format 0, for the terminal apparatus supporting the sTTI operation.

In the CSS, the terminal apparatus can decode PDCCH with CRC scrambled by TPC-PUCCH-RNTI and can acquire a DCI format 3/3A. A TPC command for PUCCH may be transmitted to the terminal apparatus supporting the sTTI operation, by using the DCI format 3/3A.

In the CSS, the terminal apparatus can decode PDCCH with CRC scrambled by TPC-PUSCH-RNTI and can acquire a DCI format 3/3A. A TPC command for PUSCH may be transmitted to the terminal apparatus supporting the sTTI operation, with the DCI format 3/3A.

In the CSS, the terminal apparatus supporting the sTTI operation can decode PDCCH and/or sPDCCH with CRC scrambled by C-RNTI and can acquire a DCI format 0. Note that PUSCH may be scheduled by using the DCI format 0, for the terminal apparatus supporting the sTTI operation.

In the USS, the terminal apparatus supporting the sTTI operation can decode PDCCH and/or sPDCCH with CRC scrambled by C-RNTI and can acquire a DCI format 0/4/X. Note that sPUSCH may be scheduled by using the DCI format 0/4/x, for the terminal apparatus supporting the sTTI operation.

In the UEG-SS, the terminal apparatus supporting the sTTI operation can decode PDCCH and/or sPDCCH with CRC scrambled by C-RNTI and can acquire a DCI format 0/4/X.

In the UEG-SS, the terminal apparatus supporting the sTTI operation can decode PDCCH and/or sPDCCH with CRC scrambled by TPC-sPUCCH-RNTI and can acquire a DCI format 3/3A/Z.

In the UEG-SS, the terminal apparatus supporting the sTTI operation can decode PDCCH and/or sPDCCH with CRC scrambled by TPC-sPUSCH-RNTI and can acquire a DCI format 3/3A/Z.

Here, the sTTI operation is an operation of performing communications by using the sTTI described above, or by using at least one of physical channels, such as sPDSCH, sPDCCH, sPUSCH, sPUCCH, and sPRACH, that use the sTTI described above. In other words, the sTTI operation is an operation related to communications (i.e., transmission and reception) performed by the terminal apparatus and the base station apparatus for which the sTTI is configured. Note that the sTTI operation may include total reception processing, modulation-demodulation processing, coding, decoding, Radio Resource Management (RRM) measurement, channel evaluation (or CSI measurement), synchronization processing, and ACK/NACK processing (HARQ-ACK processing) that use sTTI or that are associated with sTTI.

The terminal apparatus that supports the sTTI operation and can detect PCFICH may be capable of estimating an sTTI pattern for indicating the configuration of sTTI in a subframe including PCFICH, based on the PDCCH region (i.e., the number of OFDM symbols allocated to the PDCCH) indicated by the PCFICH. For example, in a case that the PCFICH indicates three symbols, the sTTI pattern of the corresponding subframe may be three symbols sTTI, two symbols sTTI, two symbols sTTI, three symbols sTTI, two symbols sTTI, and two symbols sTTI.

The PDSCH is used to transmit downlink data (Downlink Shared Channel (DL-SCH)). The PDSCH is used to transmit a system information message. Here, the system information message may be cell-specific information. The system information may be included in RRC signaling. The PDSCH may be used to transmit the RRC signaling and the MAC control element.

In addition, PDSCH may be used to transmit the uplink grant only. For example, the terminal apparatus may receive (detect, decode) the uplink grant (information included in the uplink grant) in the PDSCH scheduled by the base station apparatus.

The PMCH is used to transmit multicast data (Multicast Channel (MCH)).

The synchronization signal is used for the terminal apparatus to take synchronization in the frequency domain and the time domain in the downlink. In the TDD scheme, the synchronization signal is mapped to subframes 0, 1, 5, and 6 in a radio frame. In the FDD scheme, the synchronization signal is mapped to subframes 0 and 5 in a radio frame.

The Downlink Reference Signal is used for the terminal apparatus to perform channel compensation on a downlink physical channel. The downlink reference signal is used for the terminal apparatus to obtain the downlink channel state information.

The DS is used for time frequency synchronization, identifying of a cell, and RRM measurement (intra and/or inter-frequency measurement) at a frequency at which a parameter related to DS is configured. The DS includes a plurality of signals that are transmitted at the same cycle. The DS may be configured by using PSS/SSS/CRS resources and may further be configured by using a CSI-RS resource. In the DS, RSRP and RSRQ may be measured by using resources to which the CRS and CSI-RS are mapped.

BCH, MCH, UL-SCH, and DL-SCH are transport channels. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The PUCCH and/or sPUCCH is used to transmit (or feedback) Uplink Control Information (UCI). Hereinafter, PUCCH may include sPUCCH. Here, the UCI may include Channel State Information (CSI) used to indicate a downlink channel state. The UCI may include Scheduling Request (SR) used to request an UL-SCH resource. The UCI may further include HARQ-ACKnowledgment (HARQ-ACK).

Here, the HARQ-ACK may indicate HARQ-ACK for downlink data. In other words, the HARQ-ACK may indicate ACKnowledgment (ACK, positive acknowledgment) or Negative-ACKnowledgment (NACK). Note that the downlink data may include transport blocks, MAC PDU, DL-SCH, and PDSCH. The CSI may include a channel quality indicator (CQI), a precoding matrix indicator (PMI), and/or a rank indication (RI). HARQ-ACK may be referred to as an HARQ-ACK response.

The format of PUCCH may be defined in accordance with the type of UCI to be transmitted and the combination of UCIs to be transmitted.

PUCCH format 1 is used to transmit positive SR.

PUCCH format 1a is used to transmit 1-bit HARQ-ACK or 1-bit HARQ-ACK with positive SR in a case of FDD or FDD-TDD primary cell FS1. Note that the FDD-TDD primary cell FS indicates the frame structure type (FS) of the primary cell in a case that FDD-TDD carrier aggregation (FDD-TDD CA) is performed. In other words, it can be referred to as a primary cell of a frame structure type in the FDD-TDD CA. Secondary cells can be similarly indicated. FDD-TDD CA is carrier aggregation including at least one FDD component carrier (or FDD cell) and at least one TDD component carrier (or TDD cell).

PUCCH format 1b is used to transmit 2-bit HARQ-ACK, or to transmit 2-bit HARQ-ACK with positive SR.

The PUCCH format 1b may be used for transmitting HARQ-ACK up to 4 bits by using channel selection, in a case that more than one serving cell is configured for the terminal apparatus, or in a case of TDD with a single serving cell configured for the terminal apparatus.

The channel selection can provide different interpretation by selecting one of a plurality of PUCCH resources with the same bit value. For example, the first PUCCH resource and the second PUCCH resource of the same bit value may indicate different contents. With the channel selection, HARQ-ACK can be expanded by using a plurality of PUCCH resources.

PUCCH format 2 is used to transmit a CSI report in a case that HARQ-ACK is not multiplexed.

The PUCCH format 2 may be used to transmit a CSI report with HARQ-ACK for ECP multiplexed.

PUCCH format 2a is used to transmit a CSI report with a 1-bit HARQ-ACK for NCP multiplexed.

PUCCH format 2b is used to transmit a CSI report with a 2-bit HARQ-ACK for NCP multiplexed.

In the PUCCH format 2a/2b that supports NCP only, a bit sequence is mapped to one modulation symbol that has been used to generate DMRS for PUCCH. In other words, in the PUCCH format 2a/2b that supports NCP only, a DMRS symbol can be used as a symbol to which data can be allocated.

PUCCH format 3 is used to transmit HARQ-ACK up to 10 bits for FDD or FDD-TDD primary cell FS1, 20-bit HARQ-ACK for TDD, and 21-bit HARQ-ACK for FDD-TDD primary cell FS2.

In addition, the PUCCH format 3 may be used to transmit UCI up to 11 bits corresponding to 10-bit HARQ-ACK and 1-bit positive/negative SR for FDD or FDD-TDD, UCI up to 21 bits corresponding to 20-bit HARQ-ACK and 1-bit positive/negative SR for TDD, and UCI up to 22 bits corresponding to 21-bit HARQ-ACK and 1-bit positive/negative SR for FDD-TDD primary cell FS2.

In addition, the PUCCH format 3 may be used to transmit UCI up to 11 bits corresponding to 10-bit HARQ-ACK and 1-bit positive/negative SR for FDD or FDD-TDD, UCI up to 21 bits corresponding to 20-bit HARQ-ACK and 1-bit positive/negative SR for TDD, and UCI up to 22 bits corresponding to 21-bit HARQ-ACK and 1-bit positive/negative SR for FDD-TDD primary cell FS2.

Furthermore, the PUCCH format 3 may be used to transmit HARQ-ACK, 1-bit positive/negative SR (if any), and a CSI report.

PUCCH format 4 is used to transmit UCI that is more than 22 bits including HARQ-ACK, SR (if any), and a periodic CSI report (if any).

Furthermore, the PUCCH format 4 may be used to transmit more than one CSI report and SR (if any).

PUCCH format 5 is used to transmit UCI that is more than 22 bits including HARQ-ACK, SR (if any), and a periodic CSI report (if any).

Furthermore, PUCCH format 5 may be used to transmit more than one CSI report and SR (if any).

The number and mapping of corresponding DMRSs may vary depending on the PUCCH format. For example, in a case that NCP is added, three DMRSs are mapped in one slot for PUCCH format 1/1a/1b, two DMRSs are mapped in one slot for PUCCH format 2/2a/2b/3 and one DMRS is mapped in one slot for PUCCH format 4/5.

In a case that PUCCH is transmitted in an SRS subframe, in the PUCCH format (e.g., PUCCH format 1, 1 a, 1 b, 3) in which the shortened format is applied, the PUCCH may be transmitted by using the shortened format with the last one or two symbols to which SRS may be allocated (the last one or two symbols in the second slot of the subframe) being emptied.

The PUCCH format 1/1a/1b and the PUCCH format 2/2a/2b may be transmitted in the same RB. The cyclic shift for the PUCCH format 1/1a/1b in RB used for transmitting the PUCCH format 1/1a/1b and the PUCCH format 2/2a/2b may be individually configured.

The sPUCCH format corresponding to the PUCCH format described above may be defined for sPUCCH. Whether to transmit UCI and HARQ-ACK by using each sPUCCH format may be configured based on a certain higher layer parameter.

The PUSCH and/or sPUSCH is used for transmission of uplink data (UpLink-Shared CHannel (UL-SCH)). Hereinafter, PUSCH may include sPUSCH. Furthermore, the PUSCH may be used to transmit HARQ-ACK and/or CSI along with the uplink data. Furthermore, the PUSCH may be used to transmit CSI only or HARQ-ACK and CSI only. That is, the PUSCH may be used to transmit UCI only.

Here, the base station apparatus and the terminal apparatus may exchange (transmit and/or receive) signals/information with each other in a higher layer. For example, the base station apparatus and the terminal apparatus may transmit and/or receive Radio Resource Control (RRC) signaling in an RRC layer. RRC signaling may be referred to as RRC signal, RRC information, and RRC message. The base station apparatus and the terminal apparatus may exchange (transmit and receive) a Medium Access Control control element (MAC CE) in a MAC layer. Here, the RRC signaling and/or the MAC control element is also referred to as higher layer signal.

In the present embodiment, the meaning of the terms "higher layer parameter", "higher layer message", "higher layer signaling", "higher layer signal", "higher layer information", and "higher layer information element" may be the same. Furthermore, "higher layer parameter", "higher layer message", "higher layer information", and/or "higher layer information element" may be "parameter", "message", "information", and/or "information element" transmitted by using "higher layer signaling" or "higher layer signal".

The PUSCH may be used to transmit the RRC signaling and the MAC control element. Here, the RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user-equipment specific information may be transmitted through signaling dedicated to the certain terminal apparatus.

PRACH and/or sPRACH is used to transmit a random access preamble. Hereinafter, the PRACH may include sPRACH. For example, the PRACH (or the random access procedure) is used primarily for the terminal apparatus to synchronize the time domain with the base station apparatus. The PRACH (or the random access procedure) may also be used for an initial connection establishment procedure, a handover procedure, a connection re-establishment procedure, synchronization (timing adjustment) for uplink transmission, and transmission of scheduling request (PUSCH resource request, UL-SCH resource request).

DMRS is associated with transmission of PUSCH, sPUSCH, and/or PUCCH. The DMRS is time-multiplexed with the PUSCH, sPUSCH, or PUCCH. For example, the base station apparatus may use DMRS in order to perform channel compensation of the PUSCH, sPUSCH, or PUCCH. Depending on the type of physical channel to be demodulated, the DMRS may differ in the time multiplexing mapping and in the number of multiplexing DMRSs.

SRS is not associated with the transmission of PUSCH or PUCCH. For example, the base station apparatus may use the SRS to measure an uplink channel state or transmission timing. The SRS includes a trigger type 0SRS to be transmitted in a case that an associated parameter is configured by higher layer signaling, and a trigger type 1SRS to be transmitted in a case that an associated parameter is configured by higher layer signaling and the transmission is requested by an SRS request included in the uplink grant.

The subcarrier spacing of the various physical channels and/or physical signals described above may be defined/configured individually for each physical channel and/or physical signal. Furthermore, the time length of a single symbol of the various physical channels and/or physical signals may be defined/configured individually for each physical channel and/or physical signal. Thus, the TTI length of the various physical channels and/or physical signals may be defined/configured individually for each physical channel and/or physical signal.

In the present embodiment, a plurality of cells (component carriers corresponding to the cells) may be used to perform CA (Carrier Aggregation). The CA uses a primary cell (PCell) that establishes initial access and RRC connection, and a secondary cell that is added/changed/deleted/activated/deactivated by using the primary cell. The configuration related to the secondary cell may be transmitted to the terminal apparatus via higher layer signaling from the primary cell.

In the present embodiment, a plurality of cells (component carriers corresponding to the cell) may be used to perform DC (Dual Connectivity). In the DC, a cell group is constituted by cells belonging to each of two base station apparatuses (MeNB (Master eNB) and SeNB (Secondary eNB)). A cell group belonging to MeNB and including the primary cell is defined as a Master Cell Group (MCG), and a cell group belonging to SeNB and including a primary secondary cell (PSCell) is defined as a Secondary Cell Group (SCG). The primary secondary cell is a cell that has a function similar to that of the primary cell (a serving cell other than the secondary cell and the primary cell) in a SCG which is a cell group not including a primary cell in a case that multiple cell groups are configured.

The primary cell and the primary secondary cell serve as the primary cell in the CGs. Here, the primary cell may be a cell that allows a PUCCH and/or a control channel equivalent to the PUCCH, that is, a physical channel that can transmit UCI to be transmitted and/or allocated, may be a cell that is associated with initial access procedure/RRC connection procedure/initial connection establishment procedure, may be a cell that allows a trigger related to a random access procedure by L1 signaling, may be a cell that monitors a radio link, may be a cell that supports semi-persistent scheduling, may be a cell that detects/determines RLF, and may be a cell that is always activated. Note that in the present embodiment, a cell having the functions of the primary cell and/or the primary secondary cell may be referred to as a special cell. For a Latency Reduction (LR) cell, the primary cell/primary secondary cell/secondary cell may be defined as in the case of LTE. Hereinafter, a portion described as PCell may include PSCell. The LR cell may be a cell that can perform communications by using sTTI or may be a cell that performs communications by using a physical channel/physical signal with a shorter processing time than conventional cases.

In the present embodiment, the time domain may be expressed by using a time length or the number of symbols. Furthermore, the frequency domain may be expressed by using a bandwidth, the number of subcarriers, or the number of resource elements/resource blocks in the frequency direction.

In the LR cell, the TTI size may be changeable based on the subframe type, higher layer configuration information, and control information included in L1 signaling (that is, signaling using PDCCH).

In the LR cell, an access requiring no grant (uplink grant and/or downlink grant) may be implementable. Note that the access requiring no grant is an access that uses no control information (DCI format, downlink grant, and uplink grant) for indicating a schedule of PDSCH and PUSCH (downlink or uplink shared channel/data channel). In other words, the LR cell may employ an access mode involving neither dynamic resource allocation nor transmission indication by using PDCCH (downlink control channel).

In the LR cell, the terminal apparatus may perform, based on the functions (performance, capability) of the terminal apparatus and the configuration from the base station apparatus, HARQ-ACK and/or CSI feedback corresponding to the downlink resource (signal, channel) by using uplink resources (signals, channels) mapped to the same subframe. Note that in this subframe, a reference resource, associated with CSI, which is related to the measurement result of CSI in a certain subframe may be CRS or CSI-RS of the same subframe. Such a subframe may be referred to as a self-contained subframe.

Note that the self-contained subframe may include more than one continuous subframe. Thus, the self-contained subframe may include a plurality of subframes, or may be one transmission burst including a plurality of subframes. The last subframe of the self-contained subframe (posterior subframes including the last subframe) is preferably an uplink subframe or a special subframe. In other words, the uplink signal/uplink channel is preferably transmitted in the last subframe.

In a case that the self-contained subframe includes a plurality of downlink subframes and one uplink subframe or special subframe, HARQ-ACK for each of the plurality of downlink subframes may be transmitted in UpPTS of the one uplink subframe or the special subframe.

A communication apparatus, including a terminal apparatus and a base station apparatus, may determine ACK or NACK for the signal and feedback the resultant information, based on whether a signal has been successfully received (demodulated/decoded). The ACK indicates that the signal has been successfully received by the communication apparatus, and the NACK indicates that the signal has failed to be received by the communication apparatus. The communication apparatus to which NACK is fed back may retransmit a signal for which the NACK is fed back. The terminal apparatus determines whether to retransmit the PUSCH based on what has been indicated by the HARQ-ACK for PUSCH transmitted from the base station apparatus. The base station apparatus determines whether to retransmit the PDSCH based on what has been indicated by the HARQ-ACK for PDSCH or PDCCH/EPDCCH transmitted from the terminal apparatus. The ACK/NACK for the PUSCH transmitted by the terminal apparatus is fed back to the terminal apparatus by using PDCCH or PHICH. The ACK/NACK for the PDSCH or PDCCH/EPDCCH transmitted by the base station apparatus is fed back to the base station apparatus by using PUCCH or PUSCH.

Note that in the present embodiment, the subframe indicates the unit of transmission and/or reception by the base station apparatus and/or the terminal apparatus.

The base station apparatus may determine that the terminal apparatus is a Latency Reduction (LR) apparatus and/or a sTTI apparatus based on Logical Channel ID (LCID) for Common Control Channel (CCCH) and capability information (performance information, functional information) of the terminal apparatus.

In a case that the terminal apparatus and/or the base station apparatus has the capability of supporting LR, the processing time (processing delay, latency) may be determined based on the length of the TTI (number of symbols) used for the reception signal and/or the transmission signal. In other words, the processing time of the terminal apparatus and/or the base station apparatus having the capability of supporting LR may be variable based on the TTI length for the reception signal and/or the transmission signal.

The capability information related to LR may be information for indicating the number of symbols or the minimum number of symbols, included in sTTI, which is supported by the terminal apparatus. The capability information related to LR may be information for indicating whether the terminal apparatus supports a prescribed number of symbols to be included in sTTI. The capability information related to LR may be information for indicating whether the terminal apparatus supports processing time reduction. In addition, the capability information related to LR may be information for indicating a level at which the processing time can be reduced during the sTTI operation. In other words, the capability information related to LR may be information for indicating the range or minimum/maximum value of the reduction of the processing time. The capability information related to LR may be defined for each of the downlink and the uplink.

S1 signaling is extended to include terminal radio capability information for paging. In a case that the paging specific capability information is provided to a Mobility Management Entity (MME) by the base station apparatus, the MME may use this information so that a paging request from MME indicates information about the terminal apparatus supporting sTTI operation to the base station apparatus. The identifier may be referred to as ID (Identity, Identifier).

As for the capability information (UE radio access capability, UE EUTRA capability) of the terminal apparatus, a procedure for the terminal apparatus in the connected mode (that is, the terminal apparatus with which the RRC connection has been established) is initiated in a case that the base station apparatus (EUTRAN) needs the capability information of the terminal apparatus. The base station apparatus makes an inquiry for the capability information of the terminal apparatus. The terminal apparatus transmits the capability information of the terminal apparatus in response to the inquiry. The base station apparatus determines whether the capability information is supported. In a case that the information is supported, the base station apparatus transmits configuration information corresponding to the capability information to the terminal apparatus by using higher layer signaling or the like. With the configuration information corresponding to the capability information being configured, the terminal apparatus determines that it is possible to perform transmission and/or reception based on the capability.

The parameter related to the physical channel and/or the physical signal may be configured as a higher layer parameter for the terminal apparatus via higher layer signaling. Further, the parameter related to the configuration of some physical channels and/or physical signals may be configured for the terminal apparatus via L1 signaling (physical layer signaling, for example PDCCH/EPDCCH), such as DCI format and grant. Further, a default configuration or a default value for the physical channel and/or the physical signal configuration may be preconfigured in the terminal apparatus. The terminal apparatus may update the default value in a case that a parameter related to the configuration is notified by using higher layer signaling. Furthermore, the type of higher layer signaling/message used for the notification of the configuration may vary depending on the corresponding configuration. For example, the higher layer signaling/message may include an RRC message, broadcast information, system information, and the like.

In a case of transmitting DS at an LAA frequency, the base station apparatus may map data information and/or control information in a DS occasion. Information related to the LAA cell may be included in the data information and/or control information. For example, the data information and/or control information may include a frequency to which the LAA belongs, a cell ID, a load, a congestion status, interference/transmit power, and a buffer status relating to channel occupation time and transmission data.

In a case that DS is measured at the LAA frequency, the resources used for each signal included in DS may be extended. For example, not only antenna port 0, but also resources corresponding to antenna ports 2, 3, and the like may be used for CRS. Furthermore, not only antenna port 15, but also resources corresponding to antenna ports 16, 17, and the like may be used for CSI-RS.

In an LR cell, in a case that a resource related to DS is configured for the terminal apparatus by using higher layer signaling (RRC signaling) or system information, the terminal apparatus may dynamically receive an indication of whether to receive the DS, by using L1 signaling (control information corresponding to a certain field included in PDCCH and DCI format) or L2 signaling (control information corresponding to MAC CE), that is, by using signaling of a lower layer (signaling of a layer lower than the RRC layer).

In an LR cell, RS for demodulation/decoding and RS for CSI measurement may be common resources or may be different resources that are individually defined.

Now, cell search according to the present embodiment will be described below.

In LTE, the cell search is a procedure in which the terminal apparatus performs time frequency synchronization for a cell and detects the cell ID of the cell. EUTRA cell search supports an entire transmission bandwidth, supporting 72 or more subcarriers, that is scalable. The EUTRA cell search is performed based on PSS and SSS in the downlink. The PSS and SSS are transmitted by using 72 subcarriers at the center of the bandwidth of the first and sixth subframes of each radio frame. The neighboring cell search is performed based on the same downlink signal as the initial cell search.

In LR, in a case that communications are performed in a stand-alone manner, cell search similar to that described above may be performed.

Now, physical layer measurement according to the present embodiment will be described.

In LTE, examples of the physical layer measurement include measurement of intra-frequency and inter-frequency in EUTRAN (RSRP/RSRQ), measurement related to a time difference between reception and transmission of the terminal apparatus and a time difference regarding a reference signal used for positioning the terminal apparatus (RSTD), inter RAT measurement (EUTRAN-GERAN/UTRAN), and inter system measurement (EUTRAN-non-3 GPP RAT). Note that the physical layer measurement is performed to support mobility. Furthermore, examples of the EUTRAN measurement include measurement performed by the terminal apparatus in an idle mode and measurement performed by the terminal apparatus in a connected mode. The terminal apparatus performs EUTRAN measurements at an appropriate measurement gap and synchronizes with the cell for which the EUTRAN measurement has been performed. Note that these measurements are performed by the terminal apparatus, and thus may be referred to as terminal apparatus measurement.

The terminal apparatus may support at least two physical quantities (RSRP, RSRQ) for measurements in EUTRAN. Furthermore, the terminal apparatus may support a physical quantity related to RSSI. The terminal apparatus may perform a corresponding measurement based on a parameter related to a physical quantity configured as the higher layer parameter.

The physical layer measurement is performed to support mobility. For example, it includes measurement of intra-frequency and inter-frequency in EUTRAN (RSRP/RSRQ), measurement related to a time difference between reception and transmission of the terminal apparatus and a time difference regarding a reference signal used for positioning the terminal apparatus (RSTD), inter RAT measurement (EUTRAN-GERAN/UTRAN), inter system measurement (EUTRAN-non-3GPP RAT), and the like. Examples of the physical layer measurement include measurement for intra-frequency and inter-frequency handovers, measurement for inter RAT handover, timing measurement, measurement for RRM, and measurement related to positioning in a case that the positioning is supported. Note that the measurement for the inter RAT handover is defined in support of the handover to the GSM (trade name), UTRA FDD, UTRA TDD, CDMA2000, 1×RTT, CDMA2000 HRPD, and IEEE802.11. The EUTRAN measurement is used to support mobility. Furthermore, examples of the EUTRAN measurement include measurement performed by the terminal apparatus in an idle mode and measurement performed by the terminal apparatus in a connected mode. For example, for each of the intra-frequency and inter-frequency, the RSRP and RSRQ may be measured by the terminal apparatus in either one of the idle mode and the connected mode. The terminal apparatus performs EUTRAN measurements at an appropriate measurement gap and synchronizes with the cell for which the EUTRAN measurement has been performed.

The physical layer measurement includes measuring radio performance and reporting the radio performance to a higher layer of the network, which are performed by the terminal apparatus and the base station apparatus.

Now, a DCI format according to the present embodiment will be described in detail.

The DCI format may be defined according to the configuration of DCI to be transmitted, the combination of DCIs to be transmitted, and use of DCI to be transmitted.

DCI Format 0 is used for scheduling PUSCH in one uplink cell (i.e., serving cell).

DCI format 0A is used for scheduling PUSCH in one LAA secondary cell.

DCI format 0B is used for scheduling PUSCH in each of a plurality of subframes in one LAA secondary cell.

DCI format 1 is used for scheduling one PDSCH codeword in one cell.

DCI format 1A is used for a random access procedure initiated by compact scheduling and/or PDCCH order of one PDSCH codeword in one cell. DCI corresponding to the PDCCH order may be transmitted by using PDCCH or EPDCCH.

DCI format 1B is used for compact scheduling of one PDSCH codeword in one cell, involving precoding information.

DCI format 1C is used for extremely compact scheduling of one PDSCH codeword, MCCH change notification, SC-MCCH change notification, TDD reconfiguration (reconfiguration of TDD UL/DL configuration), and LAA common information.

DCI format 1D is used for extremely compact scheduling of one PDSCH codeword in one cell, involving precoding and power offset information.

DCI format 2/2A/2B/2C/2D is a DCI format associated with downlink transmission.

DCI Format 3 is used for transmission of a TPC command for PUCCH and/or PUSCH with 2-bit power adjustment (i.e. a TPC command by which four types of power adjustment/power correction can be implemented).

DCI Format 3A is used for transmission of a TPC command for PUCCH and/or PUSCH with 1-bit power adjustment (i.e. a TPC command by which two types of power adjustment/power correction can be implemented).

DCI Format 4 is used for PUSCH scheduling in one uplink cell with multiple antenna port transmission modes.

DCI Format 4A is used for PUSCH scheduling in one LAA cell with multiple antenna port transmission modes.

DCI format 4B is used for PUSCH scheduling with multiple antenna port transmission modes in each of multiple subframes of one LAA cell.

Here, various DCI formats used for transmission of sTTI are referred to as DCI formats X/Y/Z.

The DCI format X is used for sPUSCH scheduling in one cell (one LR cell).

The DCI format Y is used for sPDSCH scheduling in one cell (one LR cell).

The format sizes or payload sizes for the DCI format X and the DCI format Y may be the same. At this time, to reduce the number of blind detections, the DCI format X and DCI format Y may be switched based on a single field.

The DCI Format Z is used for transmission of a TPC command for sPUCCH and/or sPUSCH with power adjustment with predetermined bits (i.e. a TPC command by which power adjustment/power correction of types corresponding to the predetermined bits can be implemented).

In the DCI format 0/4/3/3A, in a case that a TPC command for sPUSCH is included, the number of bits that constitute the TPC command for sPUSCH may be greater than the number of bits constituting the TPC command for PUSCH. That is, a correction value obtained from the TPC command for the sPUSCH may be configured to be a value greater than the correction value obtained by the TPC command for the PUSCH. That is, a correction value obtained from the TPC command for the sPUSCH may be configured to be a value smaller than the correction value obtained by the TPC command for the PUSCH. That is, a correction value obtained from the TPC command for the sPUSCH may be configured to have a wider rage and a larger number of stages than the correction value obtained by the TPC command for the PUSCH.

The DCI/DCI format used for sPDSCH/sPUSCH scheduling and power adjustment may be referred to as sDCI/sDCI format.

Here, an RNTI assigned to the terminal apparatus by the base station apparatus may be used for DCI transmission. Specifically, CRC parity bits may be added to the DCI format (or downlink control information), and after the addition, the CRC parity bits may be scrambled by the RNTI. Here, the CRC parity bits added to the DCI format may be obtained from a payload of the DCI format. Note that the DCI transmission may include transmitting the DCI format and transmission by using PDCCH.

Here, in the present embodiment, "CRC parity bits", "CRC bits", and "CRC" may be the same. Additionally, "PDCCH used for transmitting the DCI format to which the CRC parity bits are added", "PDCCH including the CRC parity bits and the DCI format", "PDCCH including the CRC parity bits", and "PDCCH including the DCI format" may be the same. Additionally, "PDCCH including X" and "PDCCH with X" may be the same. The terminal apparatus may monitor the DCI format. The terminal apparatus may monitor the DCI. The terminal apparatus may monitor the PDCCH.

The terminal apparatus attempts to decode the DCI format to which the CRC parity bits scrambled by the RNTI are added, and detects, as a DCI format addressed to the terminal apparatus, the DCI format for which the CRC has been successful (also referred to as blind decoding). In other words, the terminal apparatus may detect the PDCCH with the CRC scrambled by the RNTI. The terminal apparatus may detect the PDCCH with the DCI format to which the CRC parity bits scrambled by the RNTI are added. Thus, the CRC may be added for detecting an error of DCI transmission. The CRC added to the DCI transmission may be scrambled by a corresponding RNTI or mask.

Here, the RNTI may include a Cell-Radio Network Temporary Identifier (C-RNTI). For example, the C-RNTI may be an identifier unique to the terminal apparatus and used for the identification of RRC connection and scheduling. The C-RNTI may be used for dynamically scheduled unicast transmission. In other words, the C-RNTI may be used to identify the terminal apparatus.

The RNTI may further include a Semi-Persistent Scheduling C-RNTI (SPS C-RNTI). For example, the SPS C-RNTI is an identifier, unique to the terminal apparatus, that is used for semi-persistent scheduling. The SPS C-RNTI may be used for semi-persistently scheduled unicast transmission. Here, the semi-persistently scheduled transmission includes meaning of periodically scheduled transmission.

The RNTI may include a Random Access RNTI (RA-RNTI). For example, the RA-RNTI may be an identifier used for transmission of a random access response message. In other words, the RA-RNTI may be used for the transmission of the random access response message in a random access procedure. For example, the terminal apparatus may monitor the PDCCH with the CRC scrambled by the RA-RNTI in a case the random access preamble is transmitted. The terminal apparatus may receive a random access response in the PDSCH in accordance with detection of the PDCCH with the CRC scrambled by the RA-RNTI.

Here, the PDCCH with the CRC scrambled by the C-RNTI may be transmitted in the USS or CSS. The PDCCH with the CRC scrambled by the SPS C-RNTI may be transmitted in the USS or CSS. The PDCCH with the CRC scrambled by the RA-RNTI may be transmitted only in the CSS.

Examples of RNTI for scrambling CRC include RA-RNTI, C-RNTI, SPS C-RNTI, temporary C-RNTI, eIMTA-RNTI, TPC-PUCCH-RNTI, TPC-PUSCH-RNTI, M-RNTI, P-RNTI, and SI-RNTI.

The RA-RNTI, C-RNTI, SPS C-RNTI, eIMTA-RNTI, TPC-PUCCH-RNTI, TPC-PUSCH-RNTI are configured for the terminal apparatus via higher layer signaling.

M-RNTI, P-RNTI, and SI-RNTI correspond to one value. For example, the P-RNTI corresponds to PCH and PCCH and is used for notifying paging and system information changes. The SI-RNTI corresponds to DL-SCH and BCCH, and is used to broadcast system information. The RA-RNTI corresponds to the DL-SCH and is used for random access response.

The RA-RNTI, C-RNTI, SPS C-RNTI, temporary C-RNTI eIMTA-RNTI, TPC-PUCCH-RNTI, and TPC-PUSCH-RNTI are configured by using higher layer signaling.

The TPC-sPUCCH-RNTI and/or TPC-sPUSCH-RNTI may be configured for the terminal apparatus that transmits sTTI, by using higher layer signaling.

A predetermined value may be defined for M-RNTI, P-RNTI, SI-RNTI, and CC-RNTI.

A transport channel and a logical channel corresponding to the PDCCH with the CRC scrambled by each RNTI may vary depending on the RNTI value. That is, the information indicated may differ depending on the RNTI value.

One SI-RNTI is used to address SIB1 as in the cases of all SI messages.

The SI-RNTI is used to address system information in the DCI format 1A and/or 1C.

The RA-RNTI is used to address information related to a random access procedure initiated by a PDCCH order in the DCI format 1A and/or 1C.

The P-RNTI is used to address paging information in the DCI format 1A and/or 1C.

The M-RNTI is used to address multicast information.

The TPC-PUSCH-RNTI is used to address information related to a TPC command for PUSCH in the DCI format 3/3A.

The TPC-PUCCH-RNTI is used to address information related to a TPC command for PUCCH in the DCI format 3/3A.

The TPC-sPUSCH-RNTI is used to address information related to a TPC command for sPUSCH in the DCI format 3/3A/Z.

The TPC-sPUCCH-RNTI is used to address information related to a TPC command for sPUCCH in the DCI format 3/3A/Z.

The CC-RNTI is used to address LAA common information in the DCI format 1C.

Here, the DCI format related to the downlink transmission (for example PDSCH and/or sPDSCH transmission) is also referred to as downlink grant or downlink assignment. Furthermore, the DCI format related to the uplink transmission (for example PUSCH and/or sPUSCH and/or SRS transmission) is also referred to as uplink grant and/or uplink assignment. The downlink grant may be referred to as DL grant and uplink grant may be referred to as UL grant.

In the present embodiment, a DCI format/uplink grant related to the PUSCH transmission/scheduling is referred to as a first uplink grant and a DCI format/uplink grant related to the sPUSCH transmission/scheduling is referred to as a second uplink grant.

For example, the first uplink grant may include a carrier indicator field (CIF). The first uplink grant may include information about a TPC command for the PUSCH to be scheduled. The first uplink grant may include information about cyclic shift for DMRS (DMRS associated with PUSCH transmission). The first uplink grant may include information about modulation and coding scheme (MCS) and/or information about redundancy version. The first uplink grant may include information about resource block allocation and/or information about hopping resource allocation. The first uplink grant may include information used to request for CSI transmission (CSI request). The first uplink grant may include information used to request for SRS transmission (SRS request).

Here, the uplink grant may be defined as a DCI common to a plurality of terminal apparatuses and/or a DCI dedicated to a single terminal apparatus. In other words, the uplink grant may be transmitted by using CSS and/or USS and/or UEG-SS. The uplink grant may be transmitted by using the PDCCH and/or the EPDCCH. CRC parity bits added to the uplink grant may be scrambled by predetermined RNTI or RNTI of a predetermined value.

The uplink grant may be used to define a configuration for single subframe. Thus, the uplink grant may be used to indicate a configuration commonly used in a single subframe. In other words, the configuration indicated by using the uplink grant may be valid for each single subframe. In other words, the uplink grant may be a subframe specific uplink grant. In other words, in a case that a PUSCH is scheduled by using the uplink grant, the terminal apparatus may perform transmission by using the PUSCH or sPUSCH scheduled in a subframe (by using the entire subframe).

Moreover, a DCI format including information related to allocation of frequency resources for at least PUSCH, sPUSCH, and/or sPDCCH (for example, information related to allocation of physical resources for PUSCH, sPUSCH, and/or sPDCCH) may be defined. Such a DCI format may be referred to as a second uplink grant. The second uplink grant may be used to schedule at least the PUSCH, the sPUSCH, and/or the sPDCCH.

For example, the second uplink grant may include information related to a bandwidth for PUSCH, sPUSCH, and/or sPDCCH to be scheduled. In other words, the second uplink grant may include information about the bandwidth scheduled for PUSCH transmission, sPUSCH transmission, and/or sPDCCH transmission.

For example, the second uplink grant may include information related to the start position of the physical resource block for PUSCH, sPUSCH, and/or sPDCCH to be scheduled (and/or the end position, which is the length or the number of resource blocks from the start position, for example). Furthermore, the second uplink grant may include information for indicating a physical resource block for PUSCH, sPUSCH, and sPDCCH to be scheduled.

Here, the second uplink grant may include CIF. The second uplink grant may include information about a TPC command for PUSCH to be scheduled. The second uplink grant may include information about a TPC command for sPUSCH to be scheduled. The second uplink grant may include information about cyclic shift for DMRS (PUSCH and/or DMRS associated with sPUSCH transmission). The second uplink grant may include information about MCS and/or information about redundancy version. The second uplink grant may include information about resource block allocation and/or information about hopping resource allocation. The second uplink grant may include a CSI request. The second uplink grant may include an SRS request.

Here, the information (some or all information) to be transmitted by using the second uplink grant may be transmitted by using higher layer signaling (e.g., signaling in the MAC layer and/or signaling in the RRC layer). The transmission of the downlink control information as described above by using the second uplink grant is described below. Note that the downlink control information to be transmitted by using the second uplink grant may be transmitted by using higher layer signaling.

Here, the second uplink grant may be defined as the DCI or uplink grant common to a plurality of terminal apparatuses. In other words, the second uplink grant may be transmitted by using the CSS or UEG-SS. The second uplink grant may be transmitted by using the PDCCH and/or EPDCCH only. That is, the second uplink grant may be transmitted in a specific search space for a specific physical channel.

CRC parity bits added to the second uplink grant are scrambled by a specific RNTI. For example, the specific RNTI may be a RNTI that is configured separately from a C-RNTI. Furthermore, the specific RNTI may be a RNTI that is configured as a higher layer parameter. The CRC parity bits added to the second uplink grant may be scrambled by a first UL-RNTI. The search space in which the second uplink grant is transmitted may be provided at least by the first UL-RNTI.

The second uplink grant may be used to define a configuration for a single subframe. Thus, the second uplink grant may be used to indicate a configuration commonly used in a single subframe. In other words, the configuration indicated by using the second uplink grant may be valid for each subframe or for a plurality of subframes. In other words, the second uplink grant may be a subframe specific uplink grant. In other words, in a case that a PUSCH is scheduled by using the second uplink grant, the terminal apparatus may perform transmission by using the PUSCH scheduled in a subframe (or using the entire subframe).

Furthermore, an DCI format including information about allocation of time resources for at least PUSCH and/or sPUSCH may be defined as the uplink grant. Such a DCI format may be referred to as a third uplink grant. For example, the third uplink grant may include information about allocation of transmission time interval (TTI) for transmission by using PUSCH and/or sPUSCH. Note that the information about the TTI time length may be information for indicating the number of symbols to be used for transmission. Thus, the third uplink grant may be used to schedule at least PUSCH and/or sPUSCH.

For example, the third uplink grant may include information about the TTI length for PUSCH and/or sPUSCH to be scheduled. The third uplink grant may include information about the position of the DMRS to be transmitted together with PUSCH to be scheduled. The third uplink grant may include information about the position of the DMRS to be transmitted together with sPUSCH to be scheduled.

The third uplink grant may include information about the DMRS to be transmitted together with PUSCH to be scheduled (information about the DMRS cyclic shift for example). The third uplink grant may include information about the DMRS to be transmitted together with sPUSCH to be scheduled (information about the DMRS cyclic shift for example). The third uplink grant may include information about delay and time offset in transmission by using PUSCH and/or sPUSCH based on the reception (detection) of the third uplink grant.

Here, the third uplink grant may include CIF. The third uplink grant may include information about a TPC command for PUSCH to be scheduled. The third uplink grant may include information about a TPC command for sPUSCH to be scheduled. The third uplink grant may include information about cyclic shift for DMRS (that is, PUSCH and/or DMRS associated with sPUSCH transmission). The third uplink grant may include information about MCS and/or information about redundancy version. The third UL grant may include information about resource block allocation and/or information about hopping resource allocation. The third uplink grant may include a CSI request. The third uplink grant may include an SRS request. The third uplink grant may include information about a TTI index.

Here, the third uplink grant may be defined as a DCI dedicated to a single terminal apparatus. In other words, the third uplink grant may be transmitted by using USS. The third uplink grant may be transmitted by using the PDCCH, the EPDCCH, and/or the sPDCCH. The third uplink grant may be transmitted by using the PDSCH.

CRC parity bits added to the third uplink grant may be scrambled by a specific RNTI. CRC parity bits added to the third uplink grant may be scrambled by a third UL-RNTI. The search space in which the third uplink grant is transmitted may be provided at least by the second UL-RNTI.

The third uplink grant may be used to define a configuration for single TTI. Thus, the third uplink grant may be used to indicate a configuration used in a single TTI. In other words, the configuration indicated by using the third uplink grant may be valid for a single TTI. In other words, the third uplink grant may be a TTI specific uplink grant. Thus, in a case that a PUSCH is scheduled by using the third uplink grant, the terminal apparatus may perform transmission by using scheduled PUSCH in a TTI (i.e., a TTI in a subframe). Note that one TTI may be one sTTI. One sTTI may also be a sTTI in a single subframe.

As described above, the second downlink grant may be used for scheduling sPDCCH used for transmitting the third uplink grant. For example, the terminal apparatus may receive (detect) the third uplink grant by receiving (detecting) the second uplink grant. The terminal apparatus may monitor the PDCCH, the EPDCCH, and/or the sPDCCH used for transmitting the third uplink grant by monitoring (decoding or detecting) the PDCCH and/or the EPDCCH used for transmitting the second uplink grant. Note that the monitoring may include decoding and/or detecting a physical channel or information to be transmitted by the physical channel.

Here, the PDCCH and/or the EPDCCH used for transmitting the second uplink grant may be detected by monitoring by the terminal apparatus 1, and the PDCCH, EPDCCH, and/or sPDCCH resources used for transmitting the third uplink grant may be directly indicated by the information included in the second uplink grant. Here, the PDCCH, EPDCCH, and/or sPDCCH resource may include a time resource and/or a frequency resource. In other words, the PDCCH, EPDCCH, and/or sPDCCH used for transmitting the third uplink grant may not be monitored by the terminal apparatus.

In the following description, the uplink grant (DCI format) may include the first uplink grant, the second uplink grant, and/or the third uplink grant.

In a case that a resource for a PDSCH is scheduled by using the downlink grant, the terminal apparatus may receive downlink (DL-SCH) data in the PDSCH based on the scheduling. In a case that a resource for a PUSCH is scheduled in accordance with the uplink grant, the terminal apparatus may transmit uplink data (UL-SCH) and/or uplink control information (UCI) in the PUSCH based on the scheduling. In a case that a resource for an sPUSCH is scheduled in accordance with the uplink grant, the terminal apparatus may transmit uplink data and/or uplink control information in the sPUSCH based on the scheduling.

In the present embodiment, a DCI format/uplink grant related to the PDSCH transmission/scheduling is referred to as a first downlink grant and a DCI format/downlink grant related to the sPDSCH transmission/scheduling is referred to as a second downlink grant.

For example, the first downlink grant may include CIF. The first downlink grant may include information about a TPC command for PUCCH used for transmitting HARK-ACK of PDSCH to be scheduled. The first downlink grant may include information about an HARQ process number. The first downlink grant may include information about MCS and/or information about redundancy version. The first downlink grant may include information about resource block allocation and/or information for indicating concentrated allocation or a distributed allocation. The first downlink grant may include an SRS request.

For example, the second downlink grant may include information related to a bandwidth for PDSCH, sPDSCH, and/or sPDCCH to be scheduled. In other words, the second downlink grant may include information about the bandwidth scheduled for PDSCH transmission, sPDSCH transmission, and/or sPDCCH transmission.

The number of bits used for the SRS request and/or the CSI request may be determined based on the type of DCI format including the SRS request and/or the CSI request.

Next, processing time (latency) of the terminal apparatus and/or the base station apparatus according to the present embodiment will be described.

In the present embodiment, "CP added to the OFDM symbol and/or SC-FDMA symbol" may be the same meaning as "CP sequence added to a physical channel sequence transmitted by using an OFDM symbol and/or an SC-FDMA symbol".

The processing time may be determined based on the time required to receive and decode a detected signal and the time required for generation (modulation or coding) of the signal to be transmitted. The TTI length of the received signal and the TTI length of the transmission signal may be shortened so that each of the time required for the decoding and the time required for the generating is shortened in the terminal apparatus and the base station apparatus. The processing time may include timing adjustment based on timing advance, synchronization signal, and duplexing mode.

In the present embodiment, in a case that the terminal apparatus supports transmission and/or reception using sTTI (that is, sTTI operation), the terminal apparatus may reduce the processing time in TTI including 14 symbols with NCP added to OFDM symbols and/or SC-FDMA symbols for some physical channels. Whether the processing time for TTI can be shortened may be configured via higher layer signaling from the base station apparatus. In other words, in a case that the base station apparatus determines that the terminal apparatus in the cell has a capability to support sTTI based on the capability information transmitted from the terminal apparatus, the base station apparatus may configure the processing time for transmission and/or reception for TTI and/or sTTI to be shortened. The terminal apparatus may have a capability to support the shortening of the processing time individually for transmission and reception. The terminal apparatus may indicate whether the terminal apparatus has a capability to support the shortening of the processing time for each of the processing time for transmission and the processing time for reception. Moreover, each of the processing of transmission and the processing of the reception may be referred to as uplink related processing and downlink related processing. Note that time adjustment based on timing advance may be limited by shortening the processing time.

Whether the processing time is dynamically changed for each TTI length of the physical channel or is shortened based on the higher layer parameter may be configured by the base station apparatus via higher layer signaling.

Here, "supporting transmission using sTTI by the terminal apparatus" is synonymous with supporting transmission using at least one physical channel among sPUSCH, sPUCCH, and sPRACH. Furthermore, "supporting reception using sTTI by the terminal apparatus" is synonymous with supporting reception using at least one physical channel of sPDSCH or sPDCCH.

Note that sTTI may indicate whether it is supported for each physical channel. The terminal apparatus may indicate, by using the capability information, whether or not the terminal apparatus supports transmission and/or reception using sTTI for each physical channel. The base station apparatus may perform, for the terminal apparatus, configuration related to the sTTI via higher layer signaling based on the capability information.

Next, PUSCH transmit power control according to the present embodiment will be described.

In a case that the terminal apparatus transmits a PUSCH, without a concurrent PUCCH, to a serving cell c, transmit power $P_{PUSCH,c}(i)$ of the terminal apparatus for PUSCH transmission in a subframe i of the serving cell c may be given by Equation 1.

[Equation 1]
$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

In a case that the terminal apparatus transmits a PUSCH, with a concurrent PUCCH, to the serving cell c, the transmit power $P_{PUSCH,c}(i)$ of the terminal apparatus for PUSCH transmission in the subframe i of the serving cell c may be given by Equation 2.

[Equation 2]
$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

In a case that the terminal apparatus does not transmit a PUSCH for the serving cell c, for accumulation of TPC command received together with the DCI format 3/3A for the PUSCH, the terminal apparatus assumes that the transmit power $P_{PUSCH,c}(i)$ of the terminal apparatus for PUSCH transmission in the subframe i of the serving cell c has been calculated by Equation 3.

$$P_{PUSCH,c}(i) = \min\{P_{CMAX,c}(i), P_{O\_PUSCH,c}(1) + \alpha_c(1) \cdot PL_c + f_c(i)\}$$ [Equation 3]

$P_{CMAX,c}(i)$ is the transmit power of the terminal apparatus configured in the subframe i for the serving cell c. The parameter (variable, argument) on which "^" is attached is a linear value of the corresponding parameter.

In a case that the terminal apparatus does not transmit a PUSCH but transmits a PUCCH in the subframe i for the serving cell c, for accumulation of TPC command received together with the DCI format 3/3A for the PUSCH, the terminal apparatus assumes the transmit power $P_{CMAX,c}$ (i) obtained for $P_{PUCCH,c}$ (i) of the terminal apparatus for PUCCH transmission in the subframe i of the serving cell c.

In a case that the terminal apparatus does not transmit either PUSCH or PUCCH in the subframe i for the serving cell c, for accumulation of TPC command received together with the DCI format 3/3A for PUSCH, the terminal apparatus calculates $P_{CMAX,c}$(i) under an assumption that MPR=0 dB, A–MPR=0 dB, P–MPR=0 dB, and $\Delta T_c$=0 dB.

Here, Maximum Power Reduction (MPR) is an adjustment value based on various conditions for the maximum transmit power/maximum output power of the terminal apparatus. The MPR may be determined based on a channel bandwidth and/or a transmission bandwidth and a modulation scheme (such as QPSK and 16QAM) configured for the terminal apparatus. The MPR for QPSK of PUSCH is applied to PRACH, PUCCH and SRS transmission. For each subframe, the MPR is estimated for each slot and is given by the maximum value taken over for the transmission of the slot. The maximum value is the larger one of estimated values of the two slots of the same subframe. That is, of the two slots, a larger value is applied to the subframe. In other words, the MPR is estimated for each slot, and a larger one of values of slots in a subframe is applied to the subframe. For discontinuous resource allocation transmissions in one component carrier, the MPR for the maximum transmit power/maximum output power may be defined in association with the transmission bandwidth configuration and the total number of resource blocks, concurrently transmitted, that have a channel bandwidth or aggregated bandwidth.

A-MPR is MPR corresponding to additional requirements (CA, Multiple Input Multiple Output (MIMO), Dual Connectivity (DC)). For example, it corresponds to additional requirements such as Adjacent Channel Leakage Ratio (ACLR) and spectral emission. The requirements may be signaled by the network. Thus, the A-MPR may be defined based on a value of the network signaling. The A-MPR may be determined based on the bandwidth of the component carrier, the position (frequency position, frequency domain) of the resource block, and the modulation scheme. Thus, even with the same component carrier, the value of A-MPR may be independently defined depending on the frequency domain. For example, the value of A-MPR may be different between the center and the end of the bandwidth.

Note that CA is a method for performing communications with a plurality of component carriers (serving cells) being aggregated. CA for aggregating component carriers at different frequencies (i.e., carrier frequencies or center frequencies) belonging to the same operating band is referred to as intra-band CA. CA for aggregating component carriers in different operating bands is referred to as inter-band CA.

Note that MIMO is a method for performing communications by using multiple antennas (antenna ports).

For example, A-MPR corresponding to the value of the network signaling and A-MPR corresponding to the subcarrier spacing may be independently configured.

MPR and A-MPR may be defined for a serving cell. Thus, MPR and A-MPR may be defined for each serving cell.

In a case of performing the inter-band CA, an acceptable value $\Delta_{IB,c}$ may be defined for each of the component carriers (serving cells) performing CA.

Power Management MPR (P-MPR) is MPR used to ensure compliance and is applied to each serving cell. For example, the P-MPR is applied in view of electromagnetic energy absorption, unwanted emissions, densely packed area (dense scenario) where multiple RATs concurrently perform transmissions, and the like.

The MPR, the A-MPR, and the P-MPR may be defined for each serving cell. In addition, the MPR, the A-MPR, and the P-MPR may be defined for each operating band.

Each of the MPR, the A-MPR, and the P-MPR is evaluated for each slot, and the largest value thereof (i.e., of slots that constitute a subframe) is applied to the subframe. In other words, a value for reducing the value of the maximum output power that can be configured by the terminal apparatus (total transmit power configurable by the terminal apparatus) may be applied.

The maximum output power value may be determined based on at least some or all of the information received from the base station apparatus (e.g., system information or RRC message), MPR, A-MPR, P-MPR, and $\Delta_{IB,c}$. The maximum output power value is a value between a lower limit value of the maximum output power value and an upper limit value of the maximum output power. The lower limit value of the maximum output power value may be determined based on at least some or all of the information received from the base station apparatus (e.g., system information or RRC message), MPR, A-MPR, P-MPR, and $\Delta_{IB,c}$. The upper limit value of the maximum output power value may be determined based on at least some or all of the information received from the base station apparatus (e.g., system information or RRC message), MPR, A-MPR, P-MPR, and $\Delta_{IB,c}$.

$M_{PUSCH,c}$ (i) is a bandwidth of PUSCH resource assignment expressed by the number of resource blocks enabled for the serving cell c and subframe i. In other words, it is a parameter configured by DCI.

$P_{O\_NOMINAL\_PUSCH}$ and $P_{O\_UE\_PUSCH}$ are configured as higher layer parameters related to uplink power control. The $P_{O\_NOMINAL\_PUSCH}$ and $P_{O\_UE\_PUSCH}$ may be configured for each of PUSCH corresponding to a semi-persistent grant, PUSCH corresponding to a dynamic scheduled grant, and PUSCH corresponding to a random access response grant. Furthermore, in a case that more than one subframe set is configured for uplink power control, $P_{O\_NOMINAL\_PUSCH}$ and $P_{O\_UE\_PUSCH}$ corresponding to the uplink power control subframe set 2 (second subframe set) may be additionally configured for the PUSCH corresponding to the semi-persistent grant and the PUSCH corresponding to the dynamic schedule grant. In other words, even in a case that more than one subframe set is configured for the PUSCH corresponding to the random access response grant, the same $P_{O\_NOMINAL\_PUSCH}$ and $P_{O\_UE\_PUSCH}$ may be used. Here, the uplink power control subframe set indicates a group to which a subframe that shares various parameters related to uplink power control belongs (in other words, a subframe set). In other words, different uplink power control may be performed for each subframe set.

$P_{O\_PUSCH,c}$ is the sum of $P_{O\_NOMINAL-PUSCH}$ and $P_{O\_UE\_PUSCH}$ configured for the serving cell c.

$\alpha_c$ is a compensation coefficient for downlink path loss $PL_c$ in the serving cell c. The value of $\alpha_c$ is configured for each of PUSCH corresponding to the semi-persistent grant, and PUSCH corresponding to the dynamic schedule grant. The value of $\alpha_c$ used for PUSCH corresponding to the random access response grant is always 1.

$PL_c$ is an estimated value of downlink path loss calculated by the terminal apparatus for the serving cell c. The $PL_c$ may be determined based on the power value of the downlink reference signal provided by the higher layer and the reference signal received power (RSRP) based on the higher layer filter configuration for a reference serving cell.

In a case that the serving cell c belongs to a TAG (i.e., PTAG) including the primary cell, for the uplink of the primary cell, the primary cell may be used as a reference serving cell for determining the reference signal power and the RSRP filtered in the higher layer. In addition, in a case that the serving cell c belongs to the TAG including the primary cell, for the uplink of the secondary cell (i.e., the serving cell serving as the secondary cell), a serving cell configured by a higher layer parameter indicating a path loss reference or a link of reference serving cell of path loss may be used as a reference serving cell for determining the reference signal power and the RSRP filtered in the higher layer. Note that the reference signal power is a higher layer parameter corresponding to the transmit power from the base station apparatus. For example, the CRS transmit power may be based on the reference signal power.

In a case that the serving cell c belongs to a TAG (i.e., PSTAG) including the PSCell, for the uplink of the PSCell, the PSCell may be used as a reference serving cell for determining the reference signal power and the RSRP filtered in the higher layer. In addition, in a case that the serving cell c belongs to the TAG including the PSCell, for the uplink of the secondary cell other than PSCell, a serving cell configured by a higher layer parameter indicating a pathloss reference or link of reference serving cell of path loss may be used as a reference serving cell for determining the reference signal power and the RSRP filtered in the higher layer.

In a case that the serving cell c belongs to TAG (i.e., STAG) not including the primary cell or PSCell, the serving cell c may be used as a reference serving cell for determining the reference signal power and the RSRP filtered in the higher layer. In other words, the primary cell or PSCell may not be used as the reference serving cell.

$\Delta_{TF,c}$ (i) may be given based on Equation 4. $K_s$ may be given by a parameter relating to difference of MCS provided by the higher layer for each serving cell (that is, deltaMCS-enabled). $K_s$ includes 1.25 and 0. In a case that the parameter is configured to "enabled", $K_s=1.25$. In a case that the parameter is configured to "disabled", $K_s=0$. For transmission mode 2 for PUSCH, $K_s=0$.

$$\Delta_{TF,c}(i)=10\ \log_{10}((2^{BPRE \cdot K_s}-1) \cdot \beta_{offset}^{PUSCH}) \quad \text{[Equation 4]}$$

Bit Per Resource Element (BPRE) is the number of CQI/PMI bits allocated to one resource element in a case of control data transmitted by using PUSCH without UL-SCH data. Note that the CQI/PMI bits may include CRC bits. The BPRE is a sum of the sizes of code blocks allocated to one resource element for other cases.

$\beta^{PUSCH}_{offset}$ is $\beta^{CQI}_{offset}$ for control data transmitted by using PUSCH without UL-SCH data, and is 1 for other cases.

$\beta^{PUSCH}_{offset}$ may be configured for each of a case of a single codeword and a case of a plurality of codewords.

$\beta^{PUSCH}_{offset}$ may be configured for each of CQI, RI, and ACK.

$\beta^{PUSCH}_{offset}$ may be configured for each of PUSCH corresponding to the dynamic schedule grant and PUSCH corresponding to the semi-persistent grant.

In a case that more than one subframe set is configured based on a parameter related to the uplink power control subframe set (i.e., tpc-SubframeSet), $\beta^{PUSCH}_{offset}$ corresponding to the subframe set may be configured.

In a case that more than one subframe set is configured, $\beta^{PUSCH}_{offset}$ for each of the CQI, RI, and ACK may be configured for each of the subframe sets.

In a case that more than one subframe set is configured, $\beta^{PUSCH}_{offset}$ for each grant may be configured for each of the subframe sets.

In a case that more than one subframe set is configured, $\beta^{PUSCH}_{offset}$ for one code word and/or a plurality of code words may be configured for each of the subframe sets.

$\delta_{PUSCH,c}$ is a correction value for PUSCH transmit power referred as the TPC command. That is, $\delta_{PUSCH,c}$ is a correction value obtained from TPC command for PUSCH. $\delta_{PUSCH,c}$, that is, a TPC command for PUSCH, may be included in a PDCCH/EPDCCH with the DCI format 0/4. The TPC command may also be joint coded with TPC commands for other terminal apparatuses in a PDCCH with the DCI format 3/3A in which CRC parity bits are scrambled by TPC-PUSCH-RNTI.

In a case that a parameter related to uplink power control including an uplink power control subframe set is configured for the serving cell c and the subframe i belongs to the uplink power control subframe set 2 (that is, the second subframe set) indicated by the uplink power control subframe set which is the higher layer parameter, the most recent PUSCH power control adjustment state for the subframe i in the uplink power control subframe set 2 is given based on $f_{c,2}$ (i), and the terminal apparatus uses $f_{c,2}$ (i) instead of $f_c$ (i) to determine the transmit power $P_{PUSCH,c}$ (i) for PUSCH in the subframe i. Otherwise, that is, in a case that more than one subframe set is not configured or the subframe i belongs to the first uplink power control subframe set, the most recent PUSCH power control adjustment state is given based on $f_c$ (i).

In a case that accumulation is determined to be enabled based on a higher layer parameter for indicating whether the accumulation is enabled (i.e., Accumulation-enabled), or in a case that TPC command $\delta_{PUSCH,c}$ is included in a PDCCH/EPDCCH with DCI format 0 in which CRC is scrambled by temporary C-RNTI, $f_c$ (i) and $f_{c,2}$ (i) may be given by Equation 5 and/or Equation 6.

$$f_c(i)=f_c(i-1)+\delta_{PUSCH,c}(i-K_{PUSCH}) \quad \text{[Equation 5]}$$

$$f_{c,2}(i)=f_{c,2}(i-1)+\delta_{PUSCH,c}(i-K_{PUSCH}) \quad \text{[Equation 6]}$$

Power adjustment for performing addition processing (accumulation processing) for a power control adjustment value (correction value) corresponding to the value of the TPC command as in Equation 5 and/or Equation 6 may be referred to as accumulation or TPC accumulation. In a case that the accumulation processing for the power control adjustment value (correction value) based on the TPC command is not performed, power adjustment based on only the power control adjustment value (correction value) corresponding to a value of one TPC command immediately preceding may be referred to as TPC absolute.

$\delta_{PUSCH,c}$ (i-$K_{PUSCH}$) is signaled by using a PDCCH/EPDCCH with the DCI format 0/4 or a PDCCH with the DCI format 3/3A in a subframe i-$K_{PUSCH}$. $f_c$ (0) is the first value after the accumulation has been reset. $K_{PUSCH}$ may indicate the number of subframes. The value of $K_{PUSCH}$ may be used to indicate the subframe in which the TPC command to be applied for PUSCH transmission in the subframe i is transmitted.

The value of $K_{PUSCH}$ is 4 for FDD or FDD-TDD and for the serving cell FS1. Note that FDD-TDD corresponds to a case of carrier aggregation of FDD cells (FDD component carriers) and TDD cells (TDD component carriers).

In a case that more than one serving cell is configured for the terminal apparatus for TDD, and TDD UL/DL configurations of at least two serving cells configured are not the same, or in a case that a configuration related to eIMTA (that is, EIMTA-MainConfigServCell) is configured for the terminal apparatus for at least one serving cell, for FDD-TDD and serving cell FS2, a value of $K_{PUSCH}$ for the TDD UL/DL configuration refers to the uplink reference UL/DL configuration for the serving cell c. Here, the uplink reference UL/DL configuration is a TDD UL/DL configuration used to configure/define a subframe for uplink transmission and a subframe for transmission of ACK/NACK for uplink transmission. The terminal apparatus performs uplink transmission in a special subframe and an uplink subframe defined in the TDD UL/DL configuration, and performs downlink reception in a special subframe and a downlink subframe defined in the TDD UL/DL configuration.

For TDD UL/DL configurations 1 to 6, the value of $K_{PUSCH}$ is given in a table corresponding to the TDD UL/DL configuration illustrated in FIG. 3A. FIGS. 3A and 3B are diagrams, each illustrating a value of $K_{PUSCH}$ corresponding to each uplink subframe of a TDD UL/DL configuration according to the present embodiment.

FIG. X2 is a diagram illustrating a value of $K_{PUSCH}$ corresponding to an uplink subframe of a TDD UL/DL configuration. For example, in the subframe 2 of the TDD UL/DL configuration 0, the value of $K_{PUSCH}$ is 6. Thus, this indicates that the power adjustment for PUSCH transmission in the subframe 2 is performed by using the TPC command received in the subframe that is six subframes earlier than the current subframe.

The value of $K_{PUSCH}$ is 7 in a case that for the TDD UL/DL configuration 0, PUSCH transmission in the subframe 2 or 7 is scheduled by using a PDCCH/EPDCCH with the DCI format 0/4 in which the Least Significant bit (LSB) of the UL index is set to "1". For other PUSCH transmissions, the value of $K_{PUSCH}$ is given in the table corresponding to the TDD UL/DL configuration described in FIG. 3A.

For the serving cell c and a terminal apparatus that does not support the capability related to Bandwidth reduced Low complexity and/or Coverage Enhancement (BL/CE), the terminal apparatus attempts to decode, in each subframe, PDCCH with the DCI format 0/4 involving C-RNTI of the terminal apparatus, the DCI format 0 for SPS C-RNTI, or the DCI format 3/3A involving TPC-PUSCH-RNTI of the terminal apparatus, except in cases that a DRX operation is under progress or the serving cell c is deactivated.

In a case that the DCI format 0/4 and the DCI format 3/3A are both detected in the same subframe for a terminal apparatus that does not support the capability related to BL/CE, the terminal apparatus sets PUSCH transmit power by using TPC commands provided in the DCI format 0/4.

$\delta_{PUSCH,c}$ is 0 dB for a subframe in which the TPC command has not been decoded for the serving cell c, a subframe in which DRX is in progress, or a subframe in which the subframe i is not the uplink subframe in the TDD or the FDD-TDD and the serving cell c frame structure type 2.

In a case that a PDCCH/EPDCCH with the DCI format 0 is enabled as SPS activation or release PDCCH/EPDCCH, $\delta_{PUSCH,c}$ may be 0 dB.

$\delta_{PUSCH,c}$ signaled by using PDCCH with the DCI format 3/3A may be given by a certain table (i.e., a first table or a first set in a table), or may be given by a certain table (i.e., a second table or a second set in a table) determined by the TPC index provided by the higher layer as a higher layer parameter.

In a case that the transmit power of the terminal apparatus for the serving cell c reaches the maximum output power $P_{CMAX,c}$ (i), the positive TPC command is not accumulated (added) for the serving cell c. In other words, a TPC command resulting in the transmit power of the terminal apparatus for the serving cell c that exceeds $P_{CMAX,c}$ (i) is not applied. Similarly, in a case that the transmit power of the terminal apparatus has reached the minimum power, the negative TPC command is not accumulated (subtracted). In other words, the TPC command resulting in the transmit power of the terminal apparatus for the serving cell c that is smaller than the minimum power is not applied.

In a case that a configuration related to uplink power control including at least a higher layer parameter related to the uplink power control subframe set (in other words, the parameter set) is not configured for the terminal apparatus for the serving cell c, the terminal apparatus resets the accumulation based on the TPC command in a case that the value of $P_{O\_UE\_PUSCH,c}$ is changed or reconfigured by the higher layer, or in a case that the terminal apparatus receives a random access response message for the serving cell c.

In a case that a configuration related to uplink power control including at least a higher layer parameter related to the uplink power control subframe set is configured for the terminal apparatus for the serving cell c, the terminal apparatus resets the accumulation corresponding to $f_c$ (*) for the serving cell c, in a case that the value of $P_{O\_UE\_PUSCH,c}$ is changed or reconfigured by the higher layer, or in a case that the terminal apparatus receives a random access response message for the serving cell c.

In a case that a configuration related to uplink power control including at least a higher layer parameter related to the uplink power control subframe set is configured for the serving cell c, the terminal apparatus resets the accumulation corresponding to $f_{c,2}$ (*) for the serving cell c, in a case that the value of $P_{O\_UE\_PUSCH,c,2}$ is changed or reconfigured by the higher layer.

In a case that a configuration for uplink power control including at least a higher layer parameter related to the uplink power control subframe set is configured for the terminal apparatus, $f_c$ (i)=$f_c$ (i−1) holds true in a case that the subframe i belongs to the uplink power control subframe set 2 indicated by the higher layer parameter related to the uplink power control subframe set, and $f_{c,2}$ (i)=$f_{c,2}$ (i−1) holds true in a case that the subframe i does not belong to the uplink power control subframe set 2 indicated by the higher layer parameter related to the uplink power control subframe set.

Next, sPUSCH transmit power control according to the present embodiment will be described.

In a case that the terminal apparatus transmits a sPUSCH, without a concurrent PUCCH/sPUCCH, to the serving cell c, transmit power $P_{sPUSCH,c}$ (x) of the terminal apparatus for sPUSCH transmission in sTTI x of the serving cell c or sTTI x of the subframe i of the serving cell c may be given by Equation 7. Note that sTTI x may indicate the x-th sTTI from the beginning. The sTTI x may also indicate the x-th sTTI in the radio frame (i.e., in certain 10 continuous subframes). The sTTI x may also indicate the x-th sTTI in a certain subframe.

[Equation 7]

$$P_{sPUSCH,c}(x) = \min\left\{\begin{array}{l} P_{CMAX,c}(x), \\ 10\log_{10}(M_{sPUSCH,c}(x)) + P_{O\_sPUSCH,c}(j) + \alpha_c(j)\cdot PL_c + \Delta_{TF,c}(x) + f_c(x) \end{array}\right\}$$

In a case that the terminal apparatus transmits a sPUSCH, with a concurrent PUCCH/sPUSCH, to the serving cell c, transmit power $P_{sPUSCH,c}(x)$ of the terminal apparatus for sPUSCH transmission in sTTI x of the serving cell c or sTTI x of the subframe i of the serving cell c may be given by Equation 8.

[Equation 8]

$$P_{sPUSCH,c}(x) = \min\left\{\begin{array}{l} 10\log_{10}(\hat{P}_{CMAX,c}(i) - \hat{P}_{PUCCH}(i)), \\ 10\log_{10}(\hat{P}_{CMAX,c}(x) - \hat{P}_{sPUCCH}(x)), \\ 10\log_{10}(\hat{P}_{CMAX,c}(x) - \hat{P}_{PUCCH}(i) - \hat{P}_{sPUCCH}(x)), \\ 10\log_{10}(M_{sPUSCH,c}(x)) + P_{O\_sPUSCH,c}(j) + \alpha_c(j)\cdot PL_c + \Delta_{TF,c}(x) + f_c(x) \end{array}\right\}$$

In a case that the terminal apparatus does not transmit sPUSCH for the serving cell c, for accumulation of TPC command received together with the DCI format 3/3A for sPUSCH, the terminal apparatus assumes that the transmit power $P_{sPUSCH,c}(x)$ of the terminal apparatus for sPUSCH transmission in sTTI x of the serving cell c or sTTI x of the subframe i of the serving cell c has been calculated by Equation 9.

$$P_{sPUSCh,c}(x) = \min\{P_{CMAX,c}(x), P_{O\_sPUSCH,c}(1) + \alpha_c(1)\cdot PL_c + f_c(x)\} \quad \text{[Equation 9]}$$

$M_{sPUSCH,c}(x)$ is a bandwidth of sPUSCH resource assignment expressed by the number of resource blocks enabled for sTTI x of the serving cell c and subframe i. In other words, it is a parameter configured by DCI.

$P_{O\_NOMINAL\_sPUSCH}$ and $P_{O\_UE\_sPUSCH}$ may be configured as higher layer parameters related to uplink power control for sPUSCH. The $P_{O\_NOMINAL\_sPUSCH}$ and $P_{O\_UE\_sPUSCH}$ may be configured for each of sPUSCH corresponding to a semi-persistent grant, sPUSCH corresponding to a dynamic scheduled grant, and sPUSCH corresponding to a random access response grant. Furthermore, in a case that more than one subframe set is configured for uplink power control, $P_{O\_NOMINAL\_sPUSCH}$ and $P_{O\_UE\_sPUSCH}$ corresponding to the uplink power control subframe set 2 (second subframe set) may be additionally configured for the sPUSCH corresponding to the semi-persistent grant and the sPUSCH corresponding to the dynamic schedule grant. In other words, even in a case that more than one subframe set is configured for the sPUSCH corresponding to the random access response grant, the same $P_{O\_NOMINAL\_sPUSCH}$ and $P_{O\_UE\_sPUSCH}$ may be used.

$P_{O\_sPUSCH,c}$ is the sum of $P_{O\_NOMINAL\_sPUSCH}$ and $P_{O\_UE\_sPUSCH}$ configured for the serving cell c.

$\alpha_c$ and $PL_c$ may be shared with PUSCH for the serving cell c. Alternatively, $\alpha_c$ and $PL_c$ may be configured independently from PUSCH for the serving cell c. Whether $\alpha_c$ and $PL_c$ are shared with PUSCH for the serving cell c may be determined based on a certain higher layer parameter.

$\Delta_{TF,c}(x)$ may be given based on Equation 10. $K_s$ may be given by a parameter relating to difference of MCS provided by the higher layer for each serving cell (that is, deltaMCS-enabled). In a case that the parameter is configured to "enabled", $K_s=1.25$. In a case that the parameter is configured to "disabled", $K_s=0$. For transmission mode 2 for sPUSCH, $K_s=0$.

$$\Delta_{TF,c}(x) = 10\log_{10}((2^{BPRE\cdot K_s}-1)\cdot\beta_{offset}^{PUSCH}) \quad \text{[Equation 10]}$$

$\beta^{sPUSCH}_{offset}$ is $\beta^{CQI}_{offset}$ offset for control data transmitted by using sPUSCH without UL-SCH data, and is 1 for other cases.

$\beta^{sPUSCH}_{offset}$ may be configured for each of a case of a single codeword and a case of a plurality of codewords.

$\beta^{sPUSCH}_{offset}$ may be configured for each of CQI, RI, and ACK.

$\beta^{sPUSCH}_{offset}$ may be configured for each of sPUSCH corresponding to the dynamic schedule grant and sPUSCH corresponding to the semi-persistent grant.

In a case that more than one subframe set is configured based on a parameter related to the uplink power control subframe set (i.e., tpc-SubframeSet), $\beta^{sPUSCH}_{offset}$ corresponding to each of the subframe sets may be configured.

In a case that more than one subframe set is configured, $\beta^{sPUSCH}_{offset}$ for each of the CQI, RI, and ACK may be configured for each of the subframe sets.

In a case that more than one subframe set is configured, $\beta^{sPUSCH}_{offset}$ for each grant may be configured for each of the subframe sets.

In a case that more than one subframe set is configured $\beta^{sPUSCH}_{offset}$ for one code word and/or a plurality of code words may be configured for each of the subframe sets.

$\delta_{sPUSCH,c}$ is a correction value for sPUSCH transmit power referred as the TPC command. $\delta_{sPUSCH,c}$ is a correction value obtained from TPC command for sPUSCH. $\delta_{sPUSCH,c}$, that is, a TPC command for sPUSCH, may be included in a PDCCH/EPDCCH/sPDCCH with the DCI format 0/4/x. The TPC command may also be joint coded with TPC commands for other terminal apparatuses in a PDCCH/sPDCCH with the DCI format 3/3A/Z in which CRC parity bits are scrambled by TPC-sPUSCH-RNTI.

In a case that a parameter related to uplink power control including an uplink power control subframe set is configured for the terminal apparatus for the serving cell c and the subframe i including sTTI x belongs to the uplink power control subframe set 2 indicated by the uplink power control subframe set which is the higher layer parameter (that is, the second subframe set), the most recent sPUSCH power control adjustment state for the sTTI x of the subframe i in the uplink power control subframe set 2 is given based on $f_{c,2}(x)$, and the terminal apparatus uses $f_{c,2}(x)$ instead of $f_c(x)$ to determine the transmit power $P_{PUSCh,c}(x)$ for sPUSCH in sTTI x of the subframe i. Otherwise, that is, for example, in a case that a parameter related to uplink power control including an uplink power control subframe set is not configured or that more than one uplink control subframe set is not configured or sTTI of the subframe i belongs to the first uplink power control subframe set, the most recent sPUSCH power control adjustment state is given based on $f_c(x)$.

In a case that accumulation is determined to be enabled based on a higher layer parameter for indicating whether accumulation is enabled (i.e., Accumulation-enabled), or in a case that TPC command $\delta_{sPUSCH,c}$ is included in a PDCCH/EPDCCH/sPDCCH with DCI format 0 in which CRC is scrambled by temporary C-RNTI, $f_c(x)$ and $f_{c,2}(x)$ may be given by Equation 11 and/or Equation 12. Accumulation-enabled may be shared with PUSCH. Furthermore, the Accumulation-enabled may be configured separately from PUSCH for sPUSCH.

$$f_c(x)=f_c(x-1)+\delta_{PUSCH,c}(x-K_{PUSCH}) \quad \text{[Equation 11]}$$

$$f_{c,2}(x)=f_{c,2}(x-1)+\delta_{PUSCH,c}(x-K_{PUSCH}) \quad \text{[Equation 12]}$$

$\delta_{sPUSCH,c}(x-K_{sPUSCH})$ is signaled by using a PDCCH/EPDCCH/sPDCCH with the DCI format 0/4/X or PDCCH/sPDCCH with the DCI format 3/3A/Z in sTTI $(x-K_{sPUSCH})$. $f_c(0)$ is the first value after the accumulation has been reset.

The value of $K_{sPUSCH}$ is 4 or a predetermined value for FDD or FDD-TDD and for the serving cell FS1.

In a case that more than one terminal apparatus is configured for the terminal apparatus for TDD and TDD UL/DL configurations of at least two serving cells configured are not the same, or in a case that a configuration related to eIMTA is configured for the terminal apparatus for at least one serving cell, a value of $K_{sPUSCH}$ for the TDD UL/DL configuration may refer to the uplink reference UL/DL configuration for the serving cell c.

For TDD UL/DL configurations 1 to 6, the value of $K_{sPUSCH}$ is given in a table corresponding to the TDD UL/DL configuration for sPUSCH.

The value of $K_{sPUSCH}$ may be, for example, the number of sTTIs corresponding to 7 subframe length, in a case that for the TDD UL/DL configuration 0, sPUSCH transmission in sTTI included in the subframe 2 or 7 is scheduled in a PDCCH/EPDCCH/sPDCCH with the DCI format 0/4/X in which LSB of the UL index is set to "1". In other words, this DCI format 0/4/X may be detected in sTTI included in a sub-frame that is seventh subframe earlier than the subframe including sTTI x. The value of $K_{sPUSCH}$ may be the number of sTTIs corresponding to 8 subframe length, in a case that sPUSCH transmission in sTTI included in the subframe 3 or 8 is scheduled in a PDCCH/EPDCCH/sPDCCH with the DCI format 0/4/X in which LSB of the UL index is set to "1". In other words, this DCI format 0/4/X may be detected in sTTI x included in a sub-frame that is eighth subframe earlier than the subframe including sTTI x. The value of $K_{sPUSCH}$ may be the number of sTTIs corresponding to 4 subframe length, in a case that sPUSCH transmission in sTTI included in the subframe 4 or 9 is scheduled in a PDCCH/EPDCCH/sPDCCH with the DCI format 0/4/X in which LSB of the UL index is set to "1". In other words, this DCI format 0/4/X may be detected in sTTI x included in a sub-frame that is fourth subframe earlier than the subframe including sTTI x. For other sPUSCH transmissions, the value of $K_{sPUSCH}$ may be given in a table corresponding to the TDD UL/DL configuration for sPUSCH.

Note that the value of $K_{sPUSCH}$ may be determined based on the value configured in the field for indicating the transmission subframe or transmission sTTI of the sPUSCH included in the DCI format 0/4/X/3/3A/Z. For example, in a case that a value corresponding to "8" is configured in a field indicative of a transmission subframe of the sPUSCH included in the DCI format 0/4/X/3/3A/Z with TPC commands for sPUSCH, as detected in sTTIn, the value of $K_{sPUSCH}$ for sPUSCH transmission in sTTIn+8 may be 8. The field for indicating the transmission subframe or transmission sTTI of the sPUSCH may be included in the DCI format 0/4/X in place of a UL index.

For the serving cell c and the terminal apparatus that do not support the capability related to BL/CE, the terminal apparatus for which the sTTI operation has been configured attempts to decode, in each sTTI, sPDCCH with the DCI format 0/4/X involving C-RNTI of the terminal apparatus, the DCI format 0/X for SPSC-RNTI, or the DCI format 3/3A/Z involving TPC-sPUSCH-RNTI of the terminal apparatus, except in cases that a DRX operation is under progress or the serving cell c is deactivated.

Next, an example of PUSCH transmit power control in one serving cell, in a case that a TPC command for PUSCH is included in sDCI included in DL-sTTI of a predetermined symbol according to the present embodiment, that is, in a case that the DCI format 0/4/3/3A is included in a sPDCCH, will be described. Note that the number of symbols constituting one sTTI is described under an assumption that NCP is assigned to each of OFDM symbols and/or SC-FDMA symbols. Note that this does not exclude a case where ECP is assigned to each of OFDM symbols and/or SC-FDMA symbols.

Based on a certain higher layer parameter, whether the time from detection of the DCI format used for scheduling PUSCH to transmission of the PUSCH is shortened may be configured. Additionally, the value of $K_{PUSCH}$ may be shortened based on the certain higher layer parameter. For example, in a case that the TTI length of DL-sTTI is 7 symbols, that is, in a case that two sTTIs are included in one subframe, the value of $K_{PUSCH}$ for FDD or FDD-TDD and serving cell FS1 may be 2 subframes or 4 sTTIs. Thus, power adjustment for the PUSCH transmit power may be performed for the PUSCH in subframe i by using a TPC command for the PUSCH detected in DL-sTTI earlier by 4 sTTIs.

For example, in a case that the number of symbols constituting DL-sTTI (that is, TTI length of DL-sTTI) is two symbols, that is, in a case that six sTTIs are included in one subframe, the value of $K_{PUSCH}$ for FDD or FDD-TDD and serving cell FS1 may be 1 subframe or 6 sTTIs. Thus, power adjustment for the PUSCH transmit power may be performed on the PUSCH in subframe i by using a TPC command for the PUSCH detected in DL-sTTI earlier by 6 sTTIs.

In a case that the number of symbols constituting DL-sTTI is seven symbols, that is, in a case that two DL-sTTI are included in one subframe, the value of $K_{PUSCH}$ may be given based on a table corresponding to the TDD UL/DL configuration illustrated in FIG. 3B for the TDD UL/DL configurations 1 to 6.

For example, the value of $K_{PUSCH}$ may be 3 sTTIs or two subframes, in a case that the number of symbols constituting DL-sTTI is seven symbols, and PUSCH transmission in the subframes 3 or 8 is scheduled, for TDD UL/DL configuration 0, in a PDCCH/EPDCCH/sPDCCH with the DCI format 0/4 in which LSB of the UL index is set to "1". Here, the case in which the LSB of the UL index is set to "1" is described, but a predetermined bit of the UL index may be set to "1" or a predetermined value for example. The following may also include similar examples.

For example, the value of $K_{PUSCH}$ may be 5 sTTIs or three subframes, in a case that the number of symbols constituting DL-sTTI is seven symbols, and PUSCH transmission in the subframes 4 or 9 is scheduled, for TDD UL/DL configuration 0, in a PDCCH/EPDCCH/sPDCCH with the DCI format 0/4 in which LSB of the UL index is set to "1".

In a case that the number of symbols constituting DL-sTTI is seven symbols, the value of $K_{PUSCH}$ may be given based on a table corresponding to the TDD UL/DL configuration illustrated in FIG. 3(b) for the TDD UL/DL configuration 0 in a case other than the case described above.

In a case that the number of symbols constituting DL-sTTI is two symbols, that is, in a case that six DL-sTTI are included in one subframe for example, the value of $K_{PUSCH}$ may be given based on a table corresponding to the TDD UL/DL configuration for the TDD UL/DL configurations 1 to 6.

For example, the value of $K_{PUSCH}$ may be 6 sTTIs or one subframe, in a case that the number of symbols constituting DL-sTTI is two, that is, in a case that 6 DL-sTTIs are included in one subframe for example, and that PUSCH transmission in the subframes 3 or 8 is scheduled in a PDCCH/EPDCCH/sPDCCH with the DCI format 0/4 in which LSB of the UL index is set to "1" for the TDD UL/DL configuration 0. Otherwise, for the TDD UL/DL configuration 0, the value of $K_{PUSCH}$ is given based on a table corresponding to the TDD UL/DL configuration.

Note that the value of $K_{PUSCH}$ may be determined based on the value configured in the field for indicating the transmission subframe of the PUSCH included in the DCI format 0/4/X/3/3A/Z. For example, in a case that a value corresponding to "4" is configured in a field indicative of a transmission subframe for PUSCH included in the DCI format 0/4/X/3/3A/Z with TPC commands for PUSCH, as detected in sTTIn, the value of $K_{PUSCH}$ for PUSCH transmission of the subframe including sTTIn+4 may be 4. Thus, in a case that a value corresponding to "B (B is a predetermined value)" is configured in a field indicative of a transmission subframe for PUSCH included in the DCI format 0/4/X/3/3A/Z with TPC commands for PUSCH, as detected in sTTIn, the value of $K_{PUSCH}$ for PUSCH transmission of the subframe including sTTIn+B may be B. In a case that a value corresponding to "4" is configured in a field indicative of a transmission subframe for PUSCH included in the DCI format 0/4/X/3/3A/Z with TPC commands for PUSCH, as detected in the subframe i including sTTIn, the value of $K_{PUSCH}$ for PUSCH transmission of the subframe i+4 may be 4. In a case that a value corresponding to "C (C is a predetermined number)" is configured in a field indicative of a transmission subframe for PUSCH included in the DCI format 0/4/X/3/3A/Z with TPC commands for PUSCH, as detected in the subframe i including sTTIn, the value of $K_{PUSCH}$ for PUSCH transmission of the subframe i+C may be C. The field for indicating the transmission subframe for PUSCH may be included in the DCI format 0/4 in place of a UL index.

Next, an example of transmit power control according to the present embodiment for sPUSCH and PUSCH in a case that transmission of sPUSCH and PUSCH is configured in one serving cell will be described.

In a case that the number of symbols constituting the DL-sTTI is configured to be 7 symbols, the number of symbols constituting the UL-sTTI may be configured to be 7 symbols. In a case that the number of symbols constituting the DL-sTTI is configured to be 2 symbols, the number of symbols constituting the UL-sTTI may be configured to be 2 or 7 symbols. Thus, UL-sTTI and UL-TTI are preferably the same length as DL-sTTI or have the TTI length longer than DL-sTTI.

Figure 4:
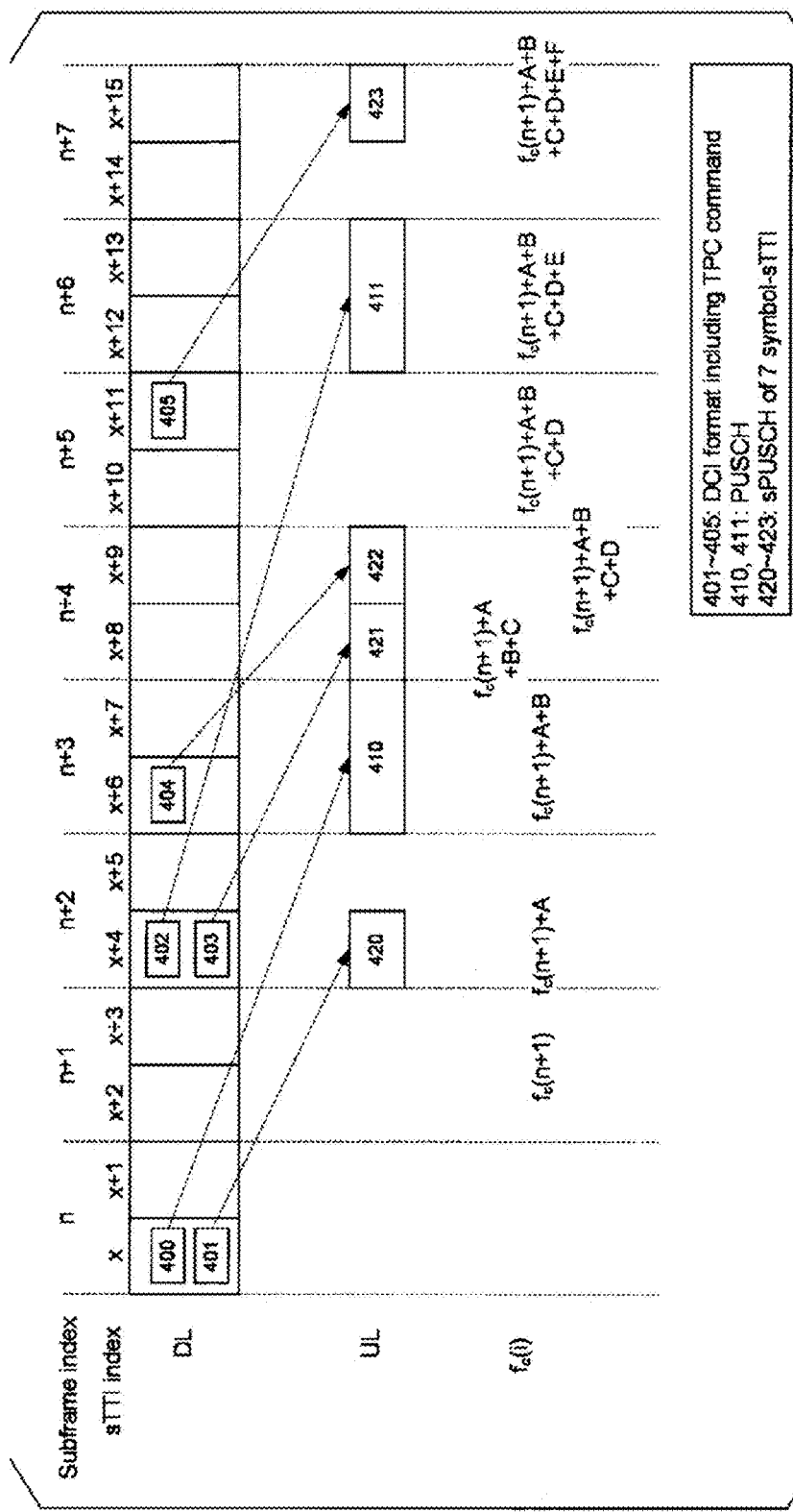
FIG. 4 is a diagram illustrating a corresponding relationship between a DCI format including a TPC command and $f_c(i)$ of each subframe according to the first embodiment.

FIG. 4 is a diagram illustrating an example of a corresponding relationship between a DCI format including a TPC command and $f_c(i)$ of each subframe according to the present embodiment. The subframes n to n+7 in FIG. 4 belong to the same uplink power control subframe set. The $f_c(i)$ is a power control adjustment value used for the transmit power of the PUSCH or the sPUSCH of the subframe i in the serving cell c. In FIG. 4, $f_c(i)$ is not reset at least in the subframes n to 7. Furthermore, in FIG. 4, $f_c(n+1)$ is a power control adjustment value obtained from TPC accumulation from subframes 0 to subframe n+1. DCI formats 400 and 402 are DCI formats used for scheduling PUSCH for the serving cell c. DCI formats 401, 403, 404, and 405 are DCI formats used for scheduling sPUSCH for the serving cell c. Each of the DCI formats 400 to 405 includes a TPC command. The terminal apparatus detects the DCI formats 400 and 401 in the subframe n. The terminal apparatus detects the DCI formats 402 and 403 in the subframe n+2. The terminal apparatus detects the DCI format 404 in the subframe n+3. The terminal apparatus detects the DCI format 405 in the subframe n+5. The DCI formats 400 to 405 may each include a field for indicating a transmission subframe or transmission sTTI for the PUSCH or the sPUSCH described above. A dotted line in FIG. 4 show corresponding relationships among the DCI formats 400 to 405, the PUSCHs 410 and 411, and the sPUSCHs 420, 421, 422, and 423. For example, the DCI format 400 is used for scheduling the PUSCH 410 in the subframe n+3. The DCI format 401 is used for scheduling the sPUSCH 420 in the subframe n+2. Similarly, the DCI formats 402 to 405 may each be used for scheduling PUSCH or sPUSCH. In a case that the correction values obtained from the TPC commands included in the DCI formats 400 to 405 are A, B, C, D, E, F, and that PUSCH and sPUSCH in the same serving cell share $f_c(i)$, and that TPC accumulation is valid, and that the DCI formats 400 to 405 each include a field for indicating the PUSCH or sPUSCH transmission subframe or transmission sTTI described above, $f_c(n+2)$ used for the transmit power for sPUSCH 420 in a subframe n+2 is $f_c(n+1)+A$. Similarly, $f_c(n+3)$ used for transmit power for the PUSCH 410 in a subframe n+3 is $f_c(n+1)+A+B$. Similarly $f_c(n+4)$ used for transmit power for the sPUSCH 421 in a subframe n+4 is $f_c(n+1)+A+B+C$, and $f_c(n+4)$ used for transmit power for sPUSCH 422 in a subframe n+4 is $f_c(n+1)+A+B+C+D$. Similarly, $f_c(n+6)$ used for transmit power for the PUSCH 411 in a subframe n+6 is $f_c(n+1)+A+B+C+D+E$. Similarly, $f_c(n+7)$ used for transmit power for the sPUSCH 423 in a subframe n+7 is $f_c(n+1)+A+B+C+D+E+F$.

In a case that the correction values obtained from the TPC commands included in the DCI formats 400 to 405 are A, B, C, D, E, F, and that PUSCH and sPUSCH in the same serving cell share $f_c(i)$, and that TPC accumulation is valid, $f_c(n+2)$ used for the transmit power for the sPUSCH 420 in the subframe n+2 may be $f_c(n+1)+A$. Similarly, $f_c(n+3)$ used for transmit power for the PUSCH 410 in a subframe n+3 is $f_c(n+1)+A+B$. Similarly $f_c(n+4)$ used for transmit power for the sPUSCH 421 in a subframe n+4 may be $f_c(n+1)+A+B+C$, and $f_c(n+4)$ used for transmit power for sPUSCH 422 in a subframe n+4 may be $f_c(n+1)+A+B+C+D$. Similarly, $f_c(n+6)$ used for transmit power for the PUSCH 411 in a subframe n+6 may be $f_c(n+1)+A+B+C+D+E$. Similarly, $f_c(n+7)$ used for transmit power for the sPUSCH 423 in a subframe n+7 may be $f_c(n+1)+A+B+C+D+E+F$.

In a case that correction values obtained from the TPC commands included in the DCI formats 400 to 405 are A, B, C, D, E, F, and that PUSCH and sPUSCH in the same serving cell share $f_c(i)$, and that TPC accumulation is valid, and that the DCI formats 400 to 405 each include no field for indicating the PUSCH or sPUSCH transmission subframe or transmission sTTI described above, $f_c(n+3)$ used for the transmit power for PUSCH 410 in the subframe n+3 may be $f_c(n+1)+A$. Furthermore, $f_c(n+4)$ used for transmit power for the sPUSCH 421 in the subframe n+4 may be $f_c(n+1)+A+C$. Furthermore, $f_c(n+4)$ used for transmit power for the sPUSCH 422 in the subframe n+4 may be $f_c(n+1)+A+C+D$. The $f_c(n+6)$ used for the transmit power for PUSCH 411 in the subframe n+6 may be $f_c(n+1)+A+C+D$. Furthermore, $f_c(n+7)$ used for transmit power for the sPUSCH 423 in the subframe n+7 may be $f_c(n+1)+A+C+D+F$.

In a case that correction values obtained from the TPC commands included in the DCI formats 400 to 405 are A, B, C, D, E, F, and that PUSCH and sPUSCH in the same serving cell share $f_c(i)$, and that TPC accumulation is valid, and that the number of bits constituting a TPC command for sPUSCH is larger than the number of bits constituting a TPC command for PUSCH, $f_c(n+3)$ used for the transmit power for the PUSCH 410 in the subframe n+3 may be $f_c(n+1)+A$. Furthermore, $f_c(n+4)$ used for transmit power for the sPUSCH 421 in the subframe n+4 may be $f_c(n+1)+A+C$. Furthermore, $f_c(n+4)$ used for transmit power for the sPUSCH 422 in the subframe n+4 may be $f_c(n+1)+A+C+D$. The $f_c(n+6)$ used for the transmit power for PUSCH 411 in the subframe n+6 may be $f_c(n+1)+A+C+D$. Furthermore, $f_c(n+7)$ used for transmit power for the sPUSCH 423 in the subframe n+7 may be $f_c(n+1)+A+C+D+F$.

In a case that the correction values obtained from the TPC commands included in the DCI formats 400 to 405 are A, B, C, D, E, F, and that PUSCH and sPUSCH in the same serving cell share $f_c(i)$, and that TPC accumulation is valid, $f_c(n+3)$ used for PUSCH 410 transmit power in the subframe n+3 may be $f_c(n+1)+A$. Furthermore, $f_c(n+4)$ used for transmit power for the sPUSCH 421 in the subframe n+4 may be $f_c(n+1)+A+C$. Furthermore, $f_c(n+4)$ used for transmit power for the sPUSCH 422 in the subframe n+4 may be $f_c(n+1)+A+C+D$. The $f_c(n+6)$ used for the transmit power for PUSCH 411 in the subframe n+6 may be $f_c(n+1)+A+C+D$. Furthermore, $f_c(n+7)$ used for the transmit power for the sPUSCH 423 in the subframe n+7 may be $f_c(n+1)+A+C+D+F$.

In other words, in a case that sPUSCH corresponding to the DCI format detected in the second subframe after the first subframe is transmitted before PUSCH corresponding to the DCI format detected in the first subframe is transmitted, the correction value obtained from the TPC command included in the DCI format detected in the first subframe may not be applied to the transmit power for PUSCH. In other words, in this case, a correction value obtained from the TPC command included in the DCI format detected in the second subframe may be applied to the transmit power for PUSCH corresponding to the DCI format detected in the first subframe.

In other words, in a case that the number of bits constituting the TPC command for sPUSCH is larger than the number of bits constituting the TPC command for PUSCH, and that sPUSCH corresponding to the DCI format detected in the second subframe after the first subframe is transmitted before PUSCH corresponding to the DCI format detected in the first subframe is transmitted, the correction value obtained from the TPC command included in the DCI format detected in the first subframe may not be applied to the transmit power for PUSCH. In other words, in this case, a correction value obtained from the TPC command included in the DCI format detected in the second subframe may be applied to the transmit power for PUSCH corresponding to the DCI format detected in the first subframe.

Note that in FIG. 4, it is described that the DCI formats 400 to 405 are used for scheduling PUSCH or sPUSCH. Like DCI format 3/3A/Z, they may also be used for transmitting only the TPC command for PUSCH or sPUSCH.

Here, in a case that TPC accumulation is invalid, that is, TPC accumulation (i.e., the accumulation processing for the correction value obtained from TPC command) is not performed, $f_c(n+2)$ used for transmit power for the sPUSCH 420 in subframe n+2 may be A. Similarly, $f_c(n+3)$ used for transmit power for the PUSCH 410 in the subframe n+3 may be B. Similarly, $f_c(n+4)$ used for transmit power for the sPUSCH 421 in the subframe n+4 may be C. Similarly, $f_c(n+4)$ used for transmit power for the sPUSCH 422 in the subframe n+4 may be D. Similarly, $f_c(n+6)$ used for transmit power for the PUSCH 411 in the subframe n+6 may be E. Similarly, $f_c(n+7)$ used for transmit power for the PUSCH 423 in the subframe n+7 may be F.

In a case that simultaneous transmission of sPUSCH and PUSCH is not configured in one serving cell and that sPUSCH transmission and PUSCH transmission overlap in the same subframe (e.g., subframe i), the terminal apparatus may drop the transmission of any one of the physical channels. In a case that sPUSCH transmission and PUSCH transmission occur in the same subframe, the terminal apparatus may drop the resource or symbol of PUSCH overlapping with the resource or symbol of sPUSCH (thus, an overlapping part). In other words, the terminal apparatus may prioritize transmission of sPUSCH and drop transmission of the resource or symbol of PUSCH overlapping with the resource or symbol of sPUSCH. In such a case, no correction value obtained from a TPC command for PUSCH may be applied to the transmit power for sPUSCH.

In a case that transmission of sPUSCH and PUSCH is configured in one serving cell (e.g., the serving cell c), the pathloss value used for the transmit power for sPUSCH and the path loss value used for the transmit power for PUSCH may be the same. That is, in a case that sPUSCH and PUSCH are transmitted in the same serving cell, the path loss value obtained from RSRP measurement based on CRS of the same serving cell may be common to sPUSCH and PUSCH. Furthermore, in a case that sPUSCH and PUSCH are transmitted in the same serving cell, the path loss reference linking to sPUSCH and the path loss reference linking to PUSCH may be the same. That is, in a case that sPUSCH and PUSCH are transmitted in the same serving cell, the path loss reference linking may be configured for each serving cell.

In a case that DL-sTTI is configured and that PDCCH is allocated only to the first DL-sTTI in the subframe, that is, in a case that a TPC command for PUSCH is allocated only to the first DL-sTTI in the subframe (in other words, the DCI format included in a PDCCH region), the value of $K_{PUSCH}$ for FDD or FDD-TDD and serving cell FS1 may be 4. Furthermore, for the TDD UL/DL configurations 1 to 6, the value of $K_{PUSCH}$ may be given based on a table corresponding to the TDD UL/DL configuration. For the TDD UL/DL configuration 0, the value of $K_{PUSCH}$ may be given as described above.

In a case that DL-sTTI is configured and that PDCCH is detected only in the first DL-sTTI in the subframe, that is, in a case that the TPC command for PUSCH is received only in the first DL-sTTI in the subframe, the value of $K_{PUSCH}$ for FDD or FDD-TDD and the serving cell FS1 may be 4. Furthermore, for the TDD UL/DL configurations 1 to 6, the value of $K_{PUSCH}$ may be given based on a table corresponding to the TDD UL/DL configuration. For the TDD UL/DL configuration 0, the value of $K_{PUSCH}$ may be given as described above.

For TDD, the number of symbols constituting DL-sTTI and the number of symbols constituting UL-sTTI are preferably the same.

In a case that the DCI format used for scheduling PUSCH and the DCI format used for scheduling sPUSCH are defined as different DCI formats, $f_c(i)$ for PUSCH and $f_c(i)$ for sPUSCH may be defined as individual parameters. In a case that TPC accumulation is valid, they may be individually accumulated.

In a case that the transmission subframe for PUSCH and the transmission subframe for the sPUSCH belong to different uplink power control subframe sets, $f_c(i)$ for PUSCH and $f_c(i)$ for sPUSCH may be defined as individual parameters. In a case that the transmission subframe for the PUSCH and the transmission subframe for the sPUSCH belong to different uplink power control subframe sets, and that TPC accumulation for each of PUSCH and sPUSCH is valid, the terminal apparatus may individually perform TPC accumulation for $f_c(i)$ for PUSCH and $f_c(i)$ for sPUSCH.

In a case that concurrent transmission of sPUSCH and PUSCH is not configured in one serving cell, and that sPUSCH transmission and PUSCH transmission occur in different subframes, $f_c(i)$ for PUSCH and $f_c(i)$ for sPUSCH may be the same. That is, $f_c(i)$ for PUSCH may be reflected to $f_c(i)$ for sPUSCH, and $f_c(i)$ for sPUSCH may be reflected to $f_c(i)$ for PUSCH.

In a case that $f_c(i)$ for PUSCH and $f_c(i)$ for sPUSCH are the same, that is, in a case that a TPC command for PUSCH and a TPC command for sPUSCH are used to calculate $f_c(i)$, the timing of applying the TPC command to the PUSCH and the timing of applying the TPC command to the sPUSCH may be different from each other. For example, the value of each of $K_{PUSCH}$ and $K_{sPUSCH}$ may be different under the conditions described above.

Further, in a case that the timing of applying the TPC command to PUSCH and the timing of applying the TPC command to sPUSCH are different under the conditions described above, $f_c(i)$ for PUSCH and $f_c(i)$ for the sPUSCH may be the same.

In a case that the DCI format 0/4/X/3/3A/Z includes a field for indicating a transmission subframe for PUSCH or a field for indicating a transmission sTTI for sPUSCH (the transmission subframe may be used instead of the transmission sTTI), $f_c(i)$ for PUSCH and $f_c(i)$ for sPUSCH may be the same.

In a case that at least one sPUSCH transmission is performed in the subframe i, $f_c(i)$ used for transmit power for sPUSCH may be applied to $f_c(i+1)$ used for transmit power for PUSCH in the subframe i+1. In a case that the subframe i and the subframe i+1 belong to the same uplink power control subframe set, $f_c(i)$ used for the transmit power for sPUSCH may be applied to $f_c(i+1)$ used for transmit power for PUSCH in the subframe i+1. In other cases such as a case that the subframe i and the subframe i+1 each belong to a different uplink power control subframe set, $f_c(i)$ used for the transmit power for sPUSCH may not be applied to $f_c(i+1)$ used for transmit power for PUSCH in the subframe i+1.

In a case that $f_c(i)$ and/or TPC accumulation for PUSCH and sPUSCH are shared in a certain serving cell c, that is, in a case that the respective TPC commands for the PUSCH and sPUSCH are reflected to single $f_c(i)$, and that the value of KPUSCH for PUSCH is shortened or changed under the condition described above due to sPUSCH transmission being allowed, and that the sPUSCH transmission is scheduled after the PUSCH transmission is scheduled, and the sPUSCH transmission is performed in a subframe preceding that used for the PUSCH transmission, the value of the TPC command included in the DCI format used for the PUSCH scheduling may be applied to $f_c(i)$ used for transmit power for sPUSCH.

In a case that the sTTI operation is performed, and that the timing of applying the DCI format 0/4 changes, and that the timing of applying the DCI format 3/3A changes, that is, in a case that the processing time for the DCI format 0/4/3/3A is shortened due to the sTTI operation, the correction value obtained from the TPC command for the DCI format 3/3A may not be applied to $f_c(i)$ used for the transmit for PUSCH, in a case that the DCI format 0/4 and the DCI format 3/3A are received in the same subframe.

In a case that the sTTI operation is performed, and that the timing of applying the DCI format 0/4 does not change, and that the timing of applying the DCI format 3/3A changes, that is, in a case that the processing time for the DCI format 0/4 is not shortened due to the sTTI operation but the processing time for the DCI format 3/3A is shortened due to the sTTI operation, the correction value obtained from the TPC command for the DCI format 3/3A may be applied to $f_c(i)$ used for the transmit for PUSCH, in a case that the DCI format 0/4 and the DCI format 3/3A are received in the same subframe.

In a case that TPC accumulation is valid, and that the terminal apparatus performs the sTTI operation, the correction value obtained from the TPC command for the sPUSCH/sTTI included in the second slot in the subframe i may not be reflected or applied to the transmit power for PUSCH/TTI in the subframe i, in a case that decoding of the TPC command for sPUSCH/sTTI included in the second slot in the subframe i is not completed earlier than the PUSCH transmission in the subframe i. However, for the next subframe, the correction value obtained from the TPC command for the sPUSCH/sTTI included in the second slot in the subframe i may be applied to $f_c(i+1)$ for PUSCH or sPUSCH in the subframe i+1. In other words, $f_c(i+1)$ for PUSCH or sPUSCH may be given based on $f_c(i)$.

In a case that TPC accumulation is valid, and that the terminal apparatus performs the sTTI operation, and that collision between the PUSCH transmission and the sPUSCH transmission occurs in the subframe i, and that the sPUSCH transmission is included in the first slot in the subframe i, the PUSCH transmission in the subframe i may be dropped. In the subframe i, the correction value obtained from the TPC command for PUSCH may not be applied.

In a case that the TPC accumulation is valid, and that the terminal apparatus performs the sTTI operation, and that the subframe i and the subframe i−2 belong to the same uplink power control subframe set in the serving cell c, and that the sPUSCH transmission in the subframe i−2 is scheduled in the subframe i−3 after the PUSCH transmission in the subframe i is scheduled in the subframe i−4, a correction value obtained from a TPC command received in the subframe i−4 may be applied to transmit power for sPUSCH for the subframe i−2.

In a case that the TPC accumulation is valid, and that the terminal apparatus performs the sTTI operation, and that the subframe i and the subframe i−2 belong to the same uplink power control subframe set in the serving cell c, and that the sPUSCH transmission in the subframe i−2 is scheduled in a subframe i−3 after the PUSCH transmission in the subframe i is scheduled in the subframe i−4, a correction value obtained from a TPC command received in the subframe i−4 may not be applied to transmit power for PUSCH for the subframe i. In other words, the TPC command detected in the subframe i−4 may be dropped. In a case that the subframe i and the subframe i−2 do not belong to the same uplink power control subframe set, the correction values obtained from TPC command for the PUSCH and TPC command for the sPUSCH may each be applied to $f_c(i)$ or $f_{c,2}(i)$ used for transmit power for PUSCH or sPUSCH, in the corresponding uplink power control subframe set.

In a case that TPC accumulation is invalid (that is, TPC absolute is valid), and that the terminal apparatus performs the sTTI operation, and that $f_c(i)$ for the sPUSCH and PUSCH in the same serving cell is shared in the TPC absolute, the correction value obtained from the TPC command for the sPUSCH/sTTI included in the second slot in the subframe i may not be reflected or applied to the transmit power for PUSCH/TTI in the subframe i, in a case that decoding of the TPC command for sPUSCH/sTTI included in the second slot in the subframe i is not completed earlier than the PUSCH transmission in the subframe i. However, for the PUSCH transmission in the next subframe (subframe i+1), the correction value obtained from the TPC command for the sPUSCH/sTTI included in the second slot in the subframe i may be applied. For example, in a case that the subframe i and a subframe i−2 belong to the same uplink power control subframe set, and that the sPUSCH transmission in the subframe i−2 is scheduled in a subframe i−3 after the PUSCH transmission in the subframe i has been scheduled in a subframe i−4, a correction value obtained from a TPC command for sPUSCH received in the subframe i−3 may be applied to transmit power for sPUSCH in the subframe i−2 and to transmit power for PUSCH in the subframe i. Thus, a correction value obtained from the most recent TPC command in the same subframe set may be applied to the transmit power for the PUSCH or the sPUSCH in the subframe i. In other cases such as a case that the subframe i and the subframe i−2 do not belong to the same uplink power control subframe set, the correction values obtained from TPC command for the PUSCH and TPC command for the sPUSCH may each be applied to $f_c(i)$ or $f_{c,2}(i)$ used for transmit power for PUSCH or sPUSCH, in the corresponding uplink power control subframe set. In a case that $f_c(i)$ for sPUSCH and PUSCH in the same serving cell is not shared in the TPC absolute, the correction value obtained from the TPC command for PUSCH may be applied to transmit power for PUSCH and the correction value obtained from the TPC command for sPUSCH may be applied to transmit power for sPUSCH.

For example, in a case that DCI formats used for scheduling PUSCH and sPUSCH to be transmitted in the uplink subframe belonging to the same uplink power control subframe set (that is, the first DCI format and the second DCI format) are detected in the same downlink subframe, the correction values obtained not only from the TPC command in the DCI format used for sPUSCH scheduling, but also from the TPC command in the DCI format used for the PUSCH scheduling may be applied to the transmit power for sPUSCH, in a case that the sPUSCH transmission timing is earlier than the PUSCH transmission timing. Furthermore, the correction values obtained not only from the TPC command in the DCI format used for PUSCH scheduling, but also from the TPC command in the DCI format used for the sPUSCH scheduling may be applied to transmit power for PUSCH.

In a case that the sTTI operation is configured, and that the uplink power control is common to PUSCH and sPUSCH in the same serving cell, and that a field for indicating a subframe or sTTI to which the TPC command is applied is configured in the DCI format including the TPC command for PUSCH and/or the DCI format including the TPC command for sPUSCH, the TPC command may be applied to the subframe indicated by the field or in sTTI. The name of the field for indicating the subframe or sTTI to which the command is applied may vary depending on the type of DCI format. For example, in a case that the field is included in the DCI format 0/4/X, the field may be referred to as a field for indicating a transmission subframe or transmission sTTI for the PUSCH or the sPUSCH. Whether the field is included in the DCI format may be determined based on higher layer parameters. For example, in a case that the first DCI format used for the PUSCH scheduling and the second DCI format used for the sPUSCH scheduling are detected in the same downlink subframe (for example, the subframe n), the correction value obtained from the TPC command in the first DCI format may not be applied to the transmit power for sPUSCH in the subframe n+2, in a case that the field included in the first DCI format indicates transmission after three subframes (PUSCH transmission in the subframe n+3 for example), and that the field included in the second DCI format indicates transmission after two subframes (sPUSCH transmission in the subframe n+2 for example). In a case that the subframe n+2 and the subframe n+3 belong to the same uplink power control subframe set, the correction value obtained from the TPC command included in the second DCI format may be applied to the transmit power for PUSCH in the subframe n+3.

In a case that a parameter related to uplink power control for PUSCH (such as $P_{O\_NOMINAL\_PUSCH}$ and $P_{O\_UE\_PUSCH}$ for example) and a parameter related to uplink power control for sPUSCH (such as $P_{O\_NOMINAL\_sPUSCH}$ and $P_{O\_UE\_sPUSCH}$) are configured to be the same value for the serving cell c, $f_c(i)$ for PUSCH and $f_c(i)$ for sPUSCH may be the same. In a case that transmit power for sPUSCH is set by using a parameter related to the uplink power control for PUSCH, $f_c(i)$ for PUSCH and $f_c(i)$ for sPUSCH may be the same. In a case that $f_c(i)$ for PUSCH and $f_c(i)$ for sPUSCH are configured to be the same based on a certain higher layer parameter, $f_c(i)$ for PUSCH and $f_c(i)$ for sPUSCH may be the same. Otherwise, $f_c(i)$ for PUSCH and $f_c(i)$ for sPUSCH may not be the same. Thus, $f_c(i)$ may be configured individually for PUSCH and sPUSCH, or may be configured to be a common parameter, depending on the condition.

In a case that SPS is configured for sPUSCH, and that the DCI format 0/4 for PUSCH and the DCI format 3/3A for sPUSCH are received in the same subframe, the correction value obtained from the TPC command in the DCI format 3/3A may be applied.

A communicable range (communication area) at each frequency controlled by a base station apparatus is regarded as a cell. Here, the communication area covered by the base station apparatus may be different in size and shape for each frequency. Moreover, the covered area may be different for each frequency. A radio network, in which cells having different types of base station apparatuses or different cell radii are located in a mixed manner in the area with the same frequency and/or different frequencies to form a single communication system, is referred to as a heterogeneous network.

The terminal apparatus is in a non-connected state with any network (serving cell managed by a network), in situations such as a situation immediately after being turned on (at the time of being started for example). Such a non-connected state is referred to as an idle mode (RRC idle). The terminal apparatus in the idle mode needs to be connected to any network in order to perform communications. In other words, the terminal apparatus needs to be in a connected mode (RRC connected). Here, the network may include a base station apparatus, an access point, a network server, a modem, and the like belonging to the network.

The terminal apparatus and the base station apparatus may employ a technique for aggregating the frequencies (component carriers or frequency band) of different frequency bands through CA and treating the resultant as a single frequency (frequency band). A component carrier is categorized as an uplink component carrier corresponding to the uplink (uplink cell) and a downlink component carrier corresponding to the downlink (downlink cell). In the present embodiment, "frequency" and "frequency band" may be used synonymously.

For example, in a case that five component carriers each of which has a frequency bandwidth of 20 MHz are aggregated through CA, a terminal apparatus capable of supporting CA may perform transmission and/or reception by assuming that the aggregated component carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band. The terminal apparatus and/or the base station apparatus may simultaneously perform transmission and/or reception by using component carriers (component carriers corresponding to cells) belonging to their operating bands.

It is also possible to aggregate multiple contiguous or discontiguous component carriers of the same frequency bands. The frequency bandwidth of each component carrier may be a narrower frequency bandwidth (e.g., 5 MHz or 10 MHz) than the receivable frequency bandwidth (e.g., 20 MHz) of the terminal apparatus, and the frequency bandwidths to be aggregated may be different from each other. The terminal apparatus and/or the base station apparatus having the function of New Radio, New Radio Access Technology (NR) may support both a cell that has backward compatibility with LTE cell and a cell that does not have the backward compatibility.

Moreover, the terminal apparatus and/or the base station apparatus having the function of LR may aggregate a plurality of component carriers (carrier types, cells) that have no backward compatibility with LTE. Note that the number of uplink component carriers to be allocated to (configured for or added for) the terminal apparatus by the base station apparatus may be the same as or may be fewer than the number of downlink component carriers.

A cell including an uplink component carrier in which an uplink control channel is configured for a radio resource request and a downlink component carrier having a cell-specific connection with the uplink component carrier is referred to as "PCell". A cell, including component carriers, which is different from the PCell is referred to as SCell. The terminal apparatus may receive a paging message, detect update of broadcast information, perform an initial access procedure, configure security information, and the like in a PCell, and may not perform these operations in a SCell.

Although a PCell is not a target of activation and deactivation controls (in other words, considered as being activated at any time), a SCell has activated and deactivated states, the change of which is explicitly specified by the base station apparatus or is made based on a timer configured for the terminal apparatus for each component carrier. PCell and SCell are collectively referred to as serving cells.

In a case of performing communications by using both an LTE cell and an LR cell, the terminal apparatus and/or the base station apparatus supporting both the LTE cell and the LR cell may configure a cell group related to the LTE cell and a cell group related to the LR cell. Thus, a cell corresponding to PCell may be included in each of the cell groups for the LTE cell and the LR cell.

CA achieves communication by using multiple cells using multiple component carriers (frequency bands), and is also referred to as cell aggregation. The terminal apparatus may have radio connection (RRC connected) with the base station apparatus via a relay station apparatus (or repeater) for each frequency. In other words, the base station apparatus according to the present embodiment may be replaced with the relay station apparatus.

The base station apparatus manages a cell, which corresponds to an area where terminal apparatuses can communicate with the base station apparatus, for each frequency. A single base station apparatus may manage multiple cells. Cells are classified into multiple types of cells depending on the size of the area (cell size) that allows communications with terminal apparatuses. For example, cells are classified into macro cells and small cells. Moreover, small cells are classified into femtocells, pico cells, and nano cells depending on the size of the area. In a case that a terminal apparatus can communicate with a certain base station apparatus, the cell configured so as to be used for the communication with the terminal apparatus is referred to as "serving cell" while the other cells not used for the communication are referred to as "neighboring cell", among the cells of the base station apparatus.

In other words, in CA, a plurality of serving cells thus configured include one PCell and one or a plurality of SCells.

The PCell is a serving cell in which an initial connection (initial RRC connection) establishment procedure has been performed, a serving cell in which a connection (RRC connection) re-establishment procedure has been initiated, or a cell indicated as PCell in a handover procedure. The PCell operates at a primary frequency. At the point of time when a connection is (re)established, or later, a SCell may be configured. Each SCell operates at a secondary frequency.

The connection may be referred to as an RRC connection. For the terminal apparatus supporting CA, a single PCell and one or more SCells may be aggregated.

In a case that more than one serving cell is configured or a secondary cell group is configured, the terminal apparatus holds, for each serving cell, received soft channel bits corresponding to at least a predetermined range for at least a predetermined number of transport blocks, in accordance with a failure in decoding of code blocks of the transport blocks.

The LAA terminal may support a function corresponding to two or more radio access technologies (RAT).

The LAA terminal supports two or more operating bands. In other words, the LAA terminal supports functions related to CA.

In other words, the LAA terminal may support TDD and HD-FDD. The LAA terminal may support FD-FDD. The LAA terminal may indicate which duplex mode/frame structure type is supported via higher layer signaling such as capability information.

The LAA terminal may be an LTE terminal of category X (where X is a predetermined value). Thus, for the LAA terminal, the maximum number of bits of the transport block transmittable/receivable in one TTI may be expanded. In LTE, 1TTI corresponds to one subframe.

In the present embodiment, TTI and subframe may individually be defined.

The LAA terminal may support multiple duplex modes/frame structure types.

FS1 can be applied to both FD-FDD and HD-FDD. In FDD, 10 subframes are available for each of the downlink transmission and the uplink transmission at a 10-ms interval. The uplink transmission and the downlink transmission are separated in the frequency domain. In the HD-FDD operation, the terminal apparatus cannot concurrently perform transmission and reception, but there is no such restriction in the FD-FDD operation.

Re-tuning time (time required for tuning (the number of subframes or symbols)) in a case that the frequency hopping or the frequency to be used is changed may be configured by higher layer signaling.

For example, in the LAA terminal, the number of supported downlink transmission modes (PDSCH transmission modes) may be reduced. In other words, in a case that the LAA terminal indicates, as capability information, the number of downlink transmission modes or the downlink transmission modes supported by the LAA terminal, the base station apparatus configures the downlink transmission mode based on the capability information. In a case that a parameter for the downlink transmission mode not supported by the LAA terminal is configured, the LAA terminal may ignore the configuration. In other words, the LAA terminal may not perform processing for the downlink transmission mode not supported by the LAA terminal. Here, the downlink transmission mode is used to indicate a transmission scheme for PDSCH corresponding to PDCCH/EPDCCH based on the downlink transmission mode, RNTI type, DCI format, and search space configured. Based on these pieces of information, the terminal apparatus can recognize whether PDSCH is transmitted by using the antenna port 0, whether PDSCH is transmitted by using transmit diversity, whether PDSCH is transmitted by using multiple antenna ports, and the like. The terminal apparatus can appropriately perform reception processing based on these pieces of information. Even in a case that DCI related to PDSCH resource allocation is detected from the same type of DCI format, the downlink transmission mode and the type of RNTI may differ, and thus the PDSCH is not necessarily transmitted in the same transmission scheme.

In a case that the terminal apparatus supports the function related to concurrent transmission of PUCCH and PUSCH, and that the terminal apparatus supports a function related to repeated transmission of PUSCH and/or repeated transmission of PUCCH, the PUCCH and PUSCH may be transmitted repeatedly for a predetermined number of times at the timings when the PUSCH transmissions occur or the timings when the PUCCH transmissions occur. Thus, the concurrent transmission of PUCCH and PUSCH may be performed at the same timing (i.e., in the same subframe).

In such cases, the PUCCH may include a CSI report, HARQ-ACK, and SR.

All signals can be transmitted and/or received in the PCell, but some signals may not be transmitted and/or received in the SCell. For example, PUCCH is transmitted in the PCell only. Additionally, unless a plurality of Timing Advance Groups (TAGs) are configured between the cells, a PRACH is transmitted only in the PCell. PBCH is transmitted in the PCell only. MIB is transmitted in the PCell only. Still, in a case that the terminal apparatus supports the function of transmitting PUCCH and MIB in the SCell, the base station apparatus may indicate to the terminal apparatus to transmit the PUCCH and MIB in the SCell (at a frequency corresponding to SCell). In other words, in a case that the terminal apparatus supports the function, the base station apparatus may configure a parameter for transmitting the PUCCH and MIB to the terminal apparatus in the SCell.

In the PCell, Radio Link Failure (RLF) is detected. In the SCell, even in a case that a condition for detecting RLF is satisfied, the detection of the RLF is not recognized. In a case that an RLF condition is satisfied in a lower layer of a PCell, the lower layer of the PCell notifies to a higher layer of the PCell that the RLF condition is satisfied. Semi-Persistant Scheduling (SPS) or Discontinuous Reception (DRX) may be performed in the PCell. In the SCell, the DRX similar to that in the PCell may be performed. The MAC configuration information/parameters are shared by the SCell with the PCell of the same cell group. Some of the parameters (for example, sTAG-Id) may be configured for each SCell. Some timers or counters may be applied to the PCell only. A timer or counter to be applied may be configured only for the SCell.

Figure 5:
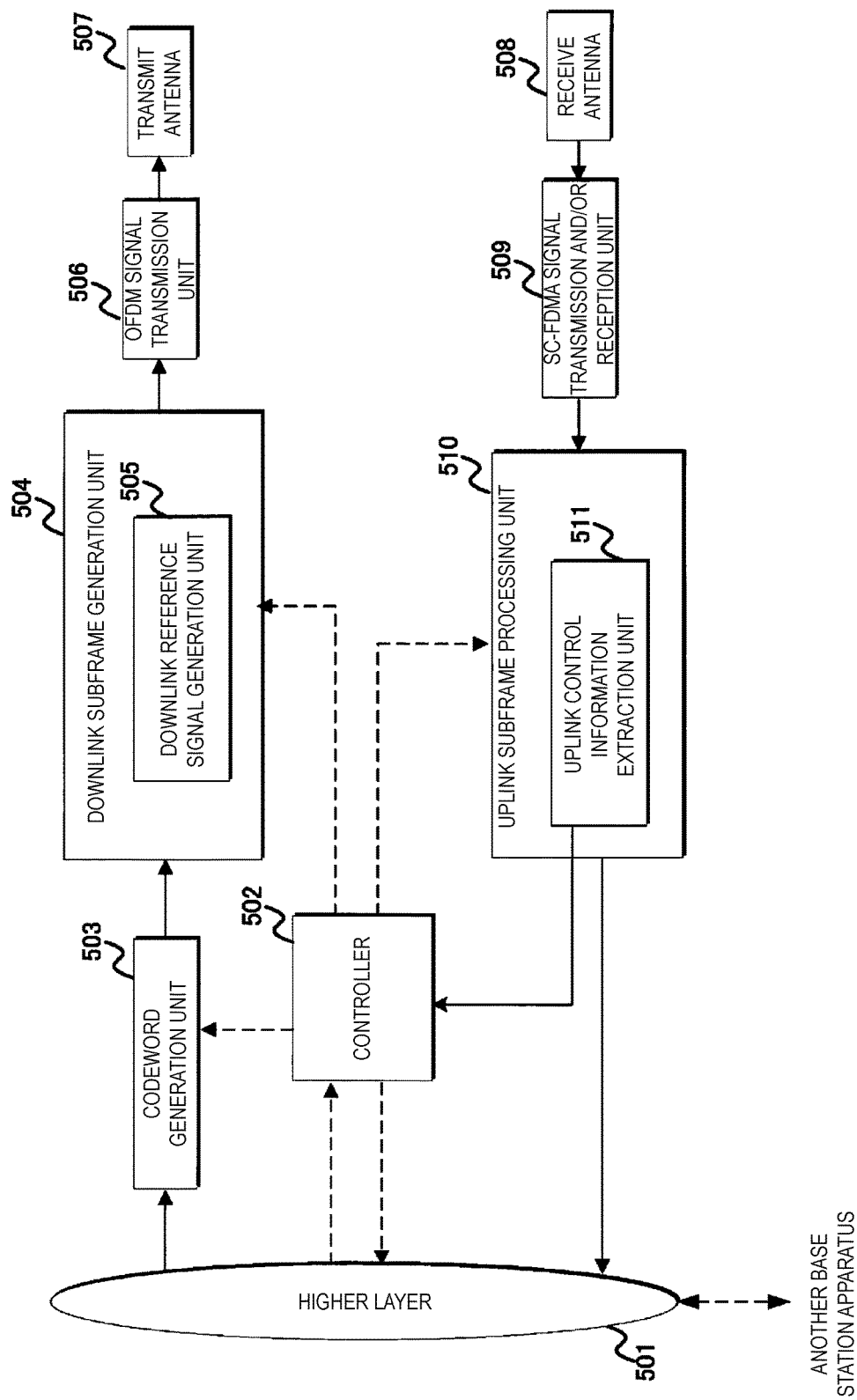
FIG. 5 is a diagram illustrating an example of a block configuration of a base station apparatus according to the first embodiment.

FIG. 5 is a schematic diagram illustrating an example of a block configuration of a base station apparatus 2 according to the present embodiment. The base station apparatus 2 includes a higher layer (higher-layer control information notification unit) 501, a controller (base station controller) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (channel state measurement unit/CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit/HARQ-ACK acquisition unit/SR acquisition unit) 511. Note that the SC-FDMA signal reception unit 509 may also serve as a measurement unit for a reception signal, CCA, and interference noise power. Note that in a case that the terminal apparatus supports transmission of the OFDM signal, the SC-FDMA signal reception unit may be an OFDM signal reception unit, or may include an OFDM signal reception unit. Note that the downlink subframe generation unit may be a downlink TTI generation unit or may include a downlink TTI generation unit. The downlink TTI generation unit may be a generation unit for a physical channel and/or a physical signal constituting the downlink TTI. Note that the same applies to the uplink. Although not illustrated, the base station apparatus may include a power control unit (downlink power control unit) for controlling/setting the transmit power for the downlink signal. The base station apparatus may include a transmitter configured to transmit a TA command. The base station apparatus may include a receiver configured to receive a measurement result, related to a time difference between reception and transmission, that is reported from the terminal apparatus.

Figure 6:
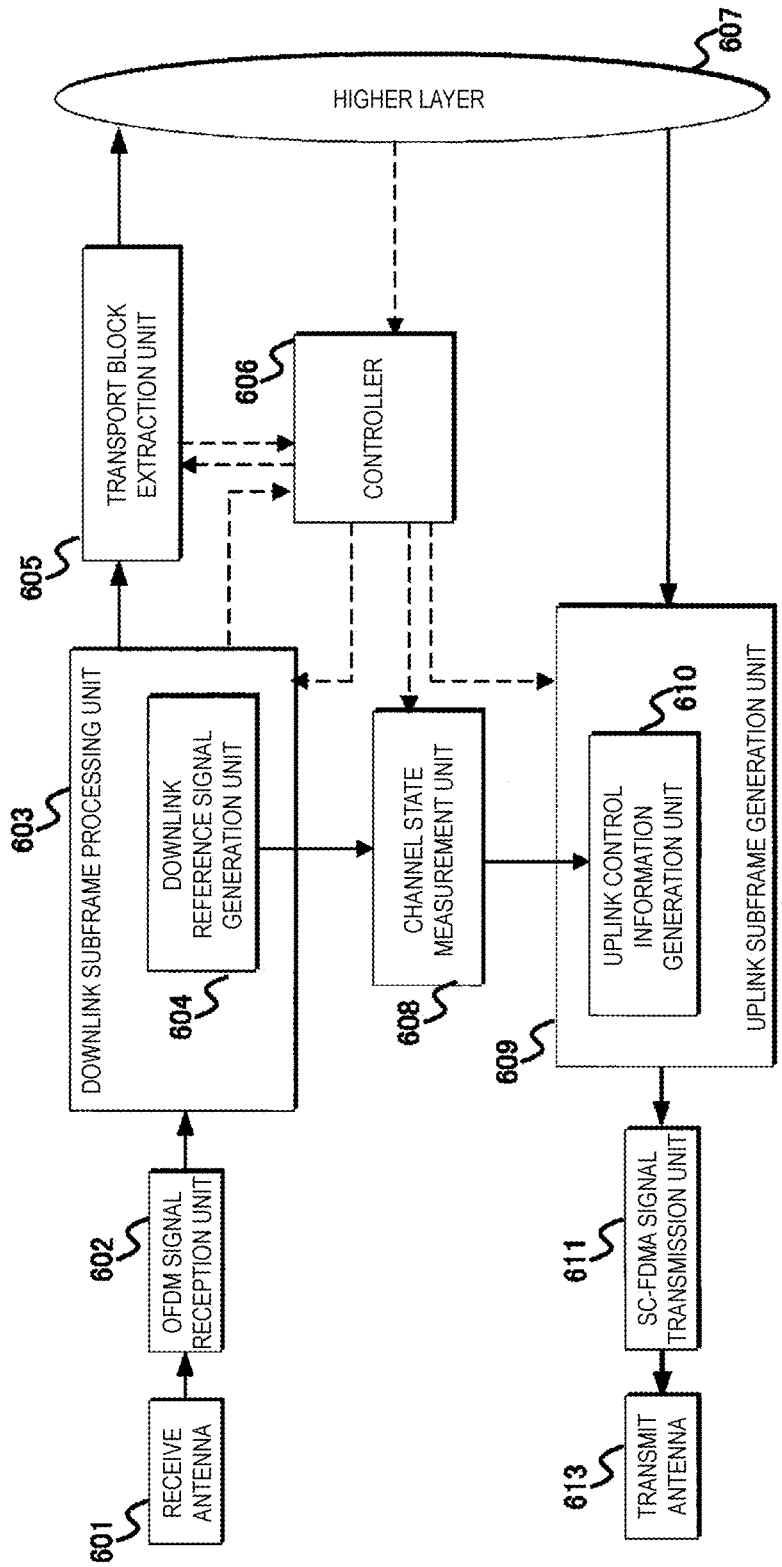
FIG. 6 is a diagram illustrating an example of a block configuration of a terminal apparatus according to the first embodiment.

FIG. 6 is a schematic diagram illustrating an example of a block configuration of the terminal apparatus 1 according to the present embodiment. The terminal apparatus 1 includes a receive antenna (terminal receive antenna) 601, an OFDM signal reception unit (downlink reception unit) 602, a downlink subframe processing unit 603, a transport block extraction unit (data extraction unit) 605, a controller (terminal controller) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610. Note that the OFDM signal reception unit 602 also serves as a measurement unit for the received signal, CCA and the interference noise power. In other words, RRM measurement may be performed in the OFDM signal reception unit 602. In a case that the terminal apparatus supports transmission of the OFDM signal, the SC-FDMA signal transmission unit may be an OFDM signal transmission unit or may include an OFDM signal transmission unit. Note that the uplink subframe generation unit may be an uplink TTI generation unit or may include a downlink TTI generation unit. Although not illustrated, the terminal apparatus may include a power control unit (uplink power control unit) for controlling/setting the transmit power for the uplink signal. The terminal apparatus may include a measurement unit for measuring a time difference between reception and transmission of the terminal apparatus. The terminal apparatus may include a transmitter configured to report a result of measuring the time difference.

In each of FIG. 5 and FIG. 6, the higher layer may include a Medium Access Control (MAC) layer, a Radio Link Control (RLC) layer, a Packet Data Convergence Protocol (PDCP) layer, and a Radio Resource Control (RRC) layer.

The RLC layer performs Acknowledged Mode (AM) data transmission to the higher layer with an indication for indicating successful transmission of Transparent Mode (TM) data transmission, Unacknowledged Mode (UM) data transmission, and higher layer Packet Data Unit (PDU) transmission. In addition, the lower layer, to which the data is transmitted, is notified of a transmission opportunity along with the total size of the RLC PDU transmitted in the transmission opportunity.

The RLC layer supports a function related to transmission of higher layer PDU, a function for error correction via Automatic Repeat request (ARQ)(only for AM data transmission), a function related to combining/dividing/reestablishment of RLC Service Data Unit (SDU) (for UM and AM data transmission only), a function related to re-dividing of RLC data PDU (for AM data transmission), a function related to rearrangement of the RLC data PDU (for AM data transmission only), a function related to redundancy detection (for UM and AM data transmission), a function related to discarding of RLC SDU (UM and AM data transmission), a function related to RLC reestablishment, and a function related to protocol error detection (for AM data transmission only).

First, a flow of downlink data transmission and reception will be described in reference to FIG. 5 and FIG. 6. In the base station apparatus 2, the controller 502 holds a Modulation and Coding Scheme (MCS) for indicating a modulation scheme, a coding rate, and the like in the downlink, downlink resource allocation for indicating RBs to be used for data transmission, and information to be used for HARQ control (a Redundancy Version, an HARQ process number, and a New Data Indicator (NDI)) and controls the codeword generation unit 503 and downlink subframe generation unit 504 based on these elements. The downlink data (also referred to as a downlink transport block, DL-SCH data, and DL-SCH transport block) transmitted from the higher layer 501 is processed through error correction coding, rate matching, and the like in the codeword generation unit 503 under the control of the controller 502 and a codeword is generated. Two codewords at maximum are transmitted at the same time in a single subframe of a single cell. In the downlink subframe generation unit 504, a downlink subframe is generated in accordance with an indication from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped to REs of some RBs, and a downlink subframe for each antenna port is generated through a precoding process. In this operation, the transmission data sequence transmitted from the higher layer 501 includes higher-layer control information, which is control information in the higher layer (e.g., dedicated (individual) RRC signaling). Moreover, in the downlink reference signal generation unit 505, a downlink reference signal is generated. The downlink subframe generation unit 504 maps the downlink reference signal to the REs in the downlink subframes in accordance with an indication from the controller 502. The downlink subframe generated in the downlink subframe generation unit 504 is modulated to an OFDM signal in the OFDM signal transmission unit 506 and transmitted via the transmit antenna 507. Although a configuration including one OFDM signal transmission unit 506 and one transmit antenna 507 is provided as an example here, a configuration including multiple OFDM signal transmission units 506 and transmit antennas 507 may be employed in a case that downlink subframes are transmitted by using multiple antenna ports. Furthermore, the downlink subframe generation unit 504 may also have a capability of generating a physical-layer downlink control channel, such as a control channel/shared channel corresponding to a PDCCH/EPDCCH/sPDCCH or a PDCCH/EPDCCH/sPDCCH and mapping the channel to a RE in a downlink subframe. A plurality of base station apparatuses transmit individual downlink subframes respectively.

In the terminal apparatus 1, an OFDM signal is received by the OFDM signal reception unit 602 via the receive antenna 601, and an OFDM demodulation process is performed on the signal.

The downlink subframe processing unit 603 first detects a physical-layer downlink control channel, such as a control channel corresponding to a PDCCH/EPDCCH/sPDCCH or a PDCCH/EPDCCH/sPDCCH. More specifically, the downlink subframe processing unit 603 performs decoding under assumption that a control channel corresponding to a PDCCH/EPDCCH/sPDCCH or a PDCCH/EPDCCH/sPDCCH is transmitted in a domain to which a control channel/shared channel corresponding to a PDCCH/EPDCCH/sPDCCH or a PDCCH/EPDCCH/sPDCCH is allocated, and checks the CRC bits added in advance (blind decoding). In other words, the downlink subframe processing unit 603 monitors the control channel/shared channel corresponding to the PDCCH/EPDCCH/sPDCCH or the PDCCH/EPDCCH/sPDCCH. In a case that the CRC bits match an ID (a single terminal-specific identifier (UEID), such as a C-RNTI or a SPS-C-RNTI, that is assigned to a single terminal, or a Temporary C-RNTI) assigned by the base station apparatus beforehand, the downlink subframe processing unit 603 recognizes that a control channel/shared channel corresponding to a PDCCH/EPDCCH/sPDCCH or a PDCCH/EPDCCH/sPDCCH has been detected and extracts a data channel/shared channel corresponding to PDSCH/sPDSCH or PDSCH/sPDSCH by using control information included in the control channel corresponding to the detected PDCCH/EPDCCH/sPDCCH or PDCCH/EPDCCH/sPDCCH.

The controller 606 holds an MCS for indicating a modulation scheme, a coding rate, and the like in the downlink based on the control information, downlink resource allocation for indicating RBs to be used for downlink data transmission, and information to be used for HARQ control, and controls the downlink subframe processing unit 603, the transport block extraction unit 605, and the like based on these elements. More specifically, the controller 606 performs control such that an RE demapping process and demodulation process corresponding to the RE mapping process and the modulation process in the downlink subframe generation unit 504, and the like are performed. The PDSCH/sPDSCH extracted from the received downlink subframe is transmitted to the transport block extraction unit 605. The downlink reference Signal extraction unit 604 in the downlink subframe processing unit 603 extracts the DLRS from the downlink subframe.

In the transport block extraction unit 605, a rate matching process, a rate matching process and error correction coding corresponding to the rate matching process and the error correction decoding in the codeword generation unit 503, and the like are performed, and a transport block is extracted and transmitted to the higher layer 607. The transport block includes the higher-layer control information, and the higher layer 607 notifies the control unit 606 of a necessary physical-layer parameter based on the higher-layer control information. The plurality of base station apparatuses 2 transmit individual downlink subframes respectively, and the terminal apparatus 1 receives these downlink subframes. Hence, the above-described processes may be performed for the downlink subframe of each of the plurality of base station apparatuses 2. In this operation, the terminal apparatus 1 may or may not recognize that multiple downlink subframes are transmitted from the plurality of base station apparatuses 2. In a case that the terminal apparatus 1 does not perform such a recognition, the terminal apparatus 1 may simply recognize that multiple downlink subframes are transmitted in multiple cells. Moreover, the transport block extraction unit 605 determines whether the transport block has been detected correctly and transmits the determination result to the control unit 606.

Here, the transport block extraction unit 605 may include a buffer portion (soft buffer unit). In the buffer unit, information about the extracted transport block can be temporarily stored. For example, in a case that the transport block extraction unit 605 receives the same transport block (retransmitted transport block) and that data decoding for the transport block is failed, the transport block extraction unit 605 couples (combines) data for the transport block temporarily stored in the buffer unit with the newly received data, and attempts to decode the coupled data. In a case that data temporary stored is no longer necessary or satisfies a predetermined condition, the buffer unit flushes the data. The condition for the data flushing varies depending on the type of transport block corresponding to the data. The buffer unit may be prepared for each type of data. For example, a message 3 buffer or HARQ buffer may be prepared as the buffer unit, or the buffer unit may be prepared for each layer, such as L1/L2/L3. Note that the flushing of information/data includes flushing a buffer in which the information and the data are stored.

Next, a flow of uplink signal transmission and/or reception will be described. In the terminal apparatus 1, a downlink reference signal extracted by the downlink reference signal extraction unit 604 is transmitted to the channel state measurement unit 608 according to the indication from the controller 606, the channel state and/or interference is measured in the channel state measurement unit 608, and further CSI is calculated based on the measured channel state and/or interference. The controller 606 indicates to the uplink control information generation unit 610 to generate an HARQ-ACK (DTX (not transmitted yet), ACK (detection succeeded), or NACK (detection failed)) and map the resultant to a downlink subframe, based on the determination result of whether the transport block is correctly detected. The terminal apparatus 1 performs these processes for the downlink subframe of each of multiple cells. In the uplink control information generation unit 610, a PUCCH including the calculated CSI and/or HARQ-ACK or a control channel/shared channel corresponding to a PUCCH is generated. In the uplink subframe generation unit 609, the PUSCH/sPUSCH including the uplink data transmitted from the higher layer 607 or a data channel/shared channel corresponding to the PUSCH/sPUSCH, and the PUCCH/sPUCCH generated by the uplink control information generation unit 610 or a control channel corresponding to the PUCCH/sPUCCH are mapped to the RBs in an uplink subframe to generate an uplink subframe.

The SC-FDMA signal is received by the SC-FDMA signal reception unit 509 via the receive antenna 508, and an SC-FDMA demodulation process is performed on the signal. According to the indication from the controller 502, the uplink subframe processing unit 510 extracts a RB to which a PUCCH is mapped, and the uplink control information extraction unit 511 extracts CSI included in the PUCCH. The extracted CSI is sent to the controller 502. The CSI is used for the control of downlink transmission parameters (MCS, downlink resource allocation, HARQ, and the like) performed by the controller 502. Note that the SC-FDMA signal reception unit may be an OFDM signal reception unit. The SC-FDMA signal reception unit may include an OFDM signal reception unit.

The base station apparatus assumes maximum output $P_{CMAX}$ configured by the terminal apparatus from a power head room report, and based on the physical uplink channel received from the terminal apparatus, assumes the upper limit value of the power for each physical uplink channel. Based on these assumptions, the base station apparatus determines the value of the transmit power control command for the physical uplink channel, and transmits the determined value to the terminal apparatus by using the PDCCH/ EPDCCH/sPDCCH with the downlink control information format. Thus, the power adjustment of the transmit power for the physical uplink channel/signal (or the uplink physical channel/physical signal) transmitted from the terminal apparatus is performed.

In a case that a PDCCH (EPDCCH)/PDSCH (or a shared channel (sPDSCH)/control channel (sPDCCH) of a LR cell corresponding to the PDCCH (EPDCCH)/PDSCH) is transmitted to the terminal apparatus, the base station apparatus allocates a PDCCH/PDSCH such that the PDCCH/PDSCH is not allocated to a resource for a PBCH (or a broadcast channel corresponding to the PBCH).

A PDSCH/sPDSCH may be used to transmit messages/ information related to each of SIB/RAR/paging/unicast for the terminal apparatus.

Frequency hopping for PUSCH/sPUSCH may be configured individually depending on the grant type. For example, the values of the parameters used for the frequency hopping for the PUSCH/sPUSCH corresponding to each of the dynamic schedule grant, the semi-persistent grant, and the RAR grant may be configured individually. The parameters may not be indicated by the uplink grant. Furthermore, these parameters may be configured via higher layer signaling including system information.

The various parameters described above may be configured for each physical channel. Furthermore, the various parameters described above may be configured for each terminal apparatus. Further, the parameters described above may be configured for each terminal apparatus. Here, the various parameters described above may be configured by using system information. The various parameters described above may be configured by using higher layer signaling (RRC signaling, MAC CE). The various parameters described above may be configured by using a PDCCH/ EPDCCH/sPDCCH. The various parameters described above may be configured as broadcast information. Furthermore, the various parameters described above may be configured as unicast information.

In the above-described embodiment, a power value required for the transmission of each PUSCH/sPUSCH is calculated based on a parameter configured by a higher layer, an adjustment value determined based on the number of PRBs allocated to the PUSCH transmission by resource assignment, downlink path loss and a coefficient by which the path loss is multiplied, an adjustment value determined based on the parameter indicating the offset of the MCS applied to the UCI, a value obtained from a TPC command, and the like. A power value required for the transmission of each PUCCH/sPUCCH is calculated based on a parameter configured by a higher layer, downlink path loss, an adjustment value determined based on the UCI transmitted in the PUCCH/sPUCCH, an adjustment value determined based on the PUCCH format or the sPUCCH format, an adjustment value determined based on the number of antenna ports used for transmission of the PUCCH/sPUCCH, a value based on a TPC command, and the like. However, it is not limited to this. An upper limit value may be set for the required power value, and the smallest value of the value based on the above-described parameters and the upper limit value (e.g., $P_{CMAX,c}$, which is the maximum output power value in the serving cell c) may be used as the required power value.

Each of programs running on a base station apparatus and a terminal apparatus according to the present embodiment may be a program configured to control a Central Processing Unit (CPU) and the like, such that the program causes a computer to operate in such a manner as to realize the functions of the present embodiment. The information handled in these apparatuses is temporarily accumulated in a Random Access Memory (RAM) while being processed, and thereafter, the information is stored in various types of Read Only Memory (ROM) such as a flash ROM, and a Hard Disk Drive (HDD), and read by the CPU to be modified or rewritten, as necessary.

Note that the terminal apparatus and/or the base station apparatus according to the present embodiment may be partially achieved by a computer. In such a case, a program for realizing such control functions may be recorded on a computer-readable recording medium to cause a computer system to read the program recorded on the recording medium for execution.

Note that it is assumed that the "computer system" refers to a computer system built into the terminal apparatus or the base station apparatus, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to realize some of the functions described above, and additionally may be configured to realize the functions described above, in combination with a program already recorded in the computer system.

Furthermore, the base station apparatus according to the above-described embodiment may be achieved as an aggregation (an apparatus group) including multiple apparatuses. Each of the apparatuses constituting such an apparatus group may include some or all portions of each function or each functional block of the base station apparatus according to the above-described embodiment. The apparatus group is required to include a complete set of functions or functional blocks of the base station apparatus. Furthermore, the terminal apparatus according to the above-described embodiment can also communicate with the base station apparatus as the aggregation.

Furthermore, the base station apparatus according to the above-described embodiment may serve as an Evolved Universal Terrestrial Radio Access Network (EUTRAN). Furthermore, the base station apparatus according to the above-described embodiment may have some or all portions of the functions of a node higher than an eNodeB.

Furthermore, some or all portions of each of the terminal apparatus and the base station apparatus according to the above-described embodiment may be typically achieved as an LSI which is an integrated circuit or may be achieved as a chip set. The functional blocks of each of the terminal apparatus and the base station apparatus may be individually achieved as a chip, or some or all of the functional blocks may be integrated into a chip. The circuit integration technique is not limited to LSI but may be realized as dedicated circuits or a multi-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station apparatus (mobile phone, mobile terminal) is described as one example of a terminal apparatus or a communication apparatus, but the present invention is not limited to this, and can be applied to a terminal apparatus or a communication apparatus for a fixed-type electronic apparatus installed indoors or outdoors, or a stationary-type electronic apparatus, such as an audio-video (AV) apparatus, a kitchen apparatus (e.g., refrigerator or microwave oven), a cleaning or washing machine, an air-conditioning apparatus, office equipment, a vending machine, a car navigation system and other on-vehicle machines, and other household apparatuses.

The embodiments have been described in detail above referring to the drawings, but the specific configuration is not limited to the embodiments and includes, for example, an amendment to a design that falls within the scope that does not depart from the gist of the embodiments. Furthermore, various modifications are possible within the scope of the embodiments defined by claims, and embodiments that are made by suitably combining technical means disclosed according to the different embodiments are also included in the technical scope of the embodiments. Furthermore, a configuration in which constituent elements, described in the above-described embodiments and having mutually the same effects, are substituted for one another is also included in the technical scope of the embodiments.

From the foregoing, the present embodiment has the following characteristics.

(1) A terminal apparatus according to an aspect of the present invention is a terminal apparatus for communicating with a base station apparatus, the terminal apparatus including: a receiver configured to receive a Downlink Control Information (DCI) format including a Transmission Power Control (TPC) command; a transmitter configured to transmit, in a case that a first DCI format is detected in a subframe n, a Physical Uplink Shared Channel (PUSCH) corresponding to the first DCI format in a subframe n+A, and transmits, in a case that a second DCI format is detected in a subframe m, a shortened PUSCH (sPUSCH) corresponding to the second DCI format in a subframe m+B, the B being a smaller value than the A; and an uplink power control unit configured not to apply a first correction value obtained from the TPC command included in the first DCI format to transmit power for the PUSCH and to apply a second correction value obtained from the TPC command included in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

(2) A terminal apparatus according to an aspect of the present invention is the above-described terminal apparatus in which the uplink power control unit applies the first correction value to the transmit power for the PUSCH, and applies the second correction value to the transmit power for the sPUSCH, in a case that the subframe m is later than the subframe n, that the subframe m+B for transmitting the sPUSCH is later than the subframe n+A for transmitting the PUSCH, and that the transmission subframe for the PUSCH and the transmission subframe for the sPUSCH belong to the identical uplink power control subframe set in the first serving cell.

(3) A terminal apparatus according to an aspect of the present invention is the above-described terminal apparatus in which the uplink power control unit applies the first correction value to the transmit power for the PUSCH, and applies the second correction value to the transmit power for the sPUSCH, in a case that the subframe m is earlier than the subframe n, that the subframe m+B for transmitting the sPUSCH is earlier than the subframe n+A for transmitting the PUSCH, and that the transmission subframe for the PUSCH and the transmission subframe for the sPUSCH belong to the identical uplink power control subframe set in the first serving cell.

(4) A terminal apparatus according to an aspect of the present invention is the above-described terminal apparatus in which the uplink power control unit applies the first correction value to the transmit power for the PUSCH, and applies the second correction value to the transmit power for the sPUSCH, in a case that the transmission subframe for the PUSCH and the transmission subframe for the sPUSCH belong to different uplink power control subframe sets in the first serving cell.

(5) A terminal apparatus according to an aspect of the present invention is the above-described terminal apparatus in which the uplink power control unit does not apply the second correction value to the transmit power for the PUSCH in a case that transmission of the PUSCH and transmission of the sPUSCH collide in a first subframe in the first serving cell and that the transmission of the sPUSCH is included in a second slot in the first subframe.

(6) A terminal apparatus according to an aspect of the present invention is the above-described terminal apparatus in which the uplink power control unit applies the first correction value and the second correction value in a subframe immediately subsequent to the first subframe, in a case that the transmission of the PUSCH and the transmission of the sPUSCH collide in the first subframe in the first serving cell and that the transmission of the sPUSCH is included in a second slot in the first subframe.

(7) A terminal apparatus according to an aspect of the present invention is the above-described terminal apparatus in which the transmitter drops the transmission of the PUSCH in a case that the transmission of the PUSCH and the transmission of the sPUSCH collide in the first subframe in the first serving cell and that the transmission of the sPUSCH is included in a first slot in the first subframe, and the uplink power control unit applies the second correction value and does not apply the first correction value to the transmit power for the sPUSCH in the first subframe in the first serving cell.

(8) A method according to an aspect of the present invention is a method in a terminal apparatus for communicating with a base station apparatus, the method including the steps of: receiving a Downlink Control Information (DCI) format including a Transmission Power Control (TPC) command; transmitting, in a case that a first DCI format is detected in a subframe n, a Physical Uplink Shared Channel (PUSCH) corresponding to the first DCI format in a subframe n+A; transmitting, in a case that a second DCI format is detected in a subframe m, a shortened PUSCH (sPUSCH) corresponding to the second DCI format in a subframe m+B, the B being a smaller value than the A; and not applying a first correction value obtained from the TPC command in the first DCI format to transmit power for the PUSCH and of applying a second correction value obtained from the TPC command in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606 Controller
607 Higher layer
608 Channel state measurement unit
609 Uplink subframe generation unit
610 Uplink control information generation unit
611, 612 SC-FDMA signal transmission unit
613, 614 Transmit antenna

The invention claimed is:

1. A terminal apparatus comprising:
a receiver configured to receive a Downlink Control Information (DCI) format including a Transmission Power Control (TPC) command;
a transmitter configured to transmit, in a case that a first DCI format is detected in a subframe n, a Physical Uplink Shared Channel (PUSCH) corresponding to the first DCI format in a subframe n+A, and transmit, in a case that a second DCI format is detected in a subframe m, a shortened PUSCH (sPUSCH) corresponding to the second DCI format in a subframe m+B, the B being a smaller value than the A; and
an uplink power control unit configured not to apply a first correction value obtained from the TPC command included in the first DCI format to transmit power for the PUSCH and to apply a second correction value obtained from the TPC command included in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

2. The terminal apparatus according to claim 1, wherein the uplink power control unit
applies the first correction value to the transmit power for the PUSCH, and
applies the second correction value to the transmit power for the sPUSCH,
in a case that the subframe m is later than the subframe n, that the subframe m+B for transmitting the sPUSCH is later than the subframe n+A for transmitting the PUSCH, and that the transmission subframe for the PUSCH and the transmission subframe for the sPUSCH belong to the identical uplink power control subframe set in the first serving cell.

3. The terminal apparatus according to claim 1, wherein the uplink power control unit
applies the first correction value to the transmit power for the PUSCH, and
applies the second correction value to the transmit power for the sPUSCH,
in a case that the subframe m is earlier than the subframe n, that the subframe m+B for transmitting the sPUSCH is earlier than the subframe n+A for transmitting the PUSCH, and that the transmission subframe for the PUSCH and the transmission subframe for the sPUSCH belong to the identical uplink power control subframe set in the first serving cell.

4. The terminal apparatus according to claim 1, wherein the uplink power control unit
applies the first correction value to the transmit power for the PUSCH, and
applies the second correction value to the transmit power for the sPUSCH,
in a case that the transmission subframe for the PUSCH and the transmission subframe for the sPUSCH belong to different uplink power control subframe sets in the first serving cell.

5. The terminal apparatus according to claim 1, wherein the uplink power control unit does not apply the second correction value to the transmit power for the PUSCH in a case that transmission of the PUSCH and transmission of the sPUSCH collide in a first subframe in the first serving cell and that the transmission of the sPUSCH is included in a second slot in the first subframe.

6. The terminal apparatus according to claim 5, wherein the uplink power control unit applies the first correction value and the second correction value in a subframe immediately subsequent to the first subframe, in a case that the transmission of the PUSCH and the transmission of the sPUSCH collide in the first subframe in the first serving cell and that the transmission of the sPUSCH is included in a second slot in the first subframe.

7. The terminal apparatus according to claim 5, wherein the transmitter drops the transmission of the PUSCH in a case that the transmission of the PUSCH and the transmission of the sPUSCH collide in the first subframe in the first serving cell and that the transmission of the sPUSCH is included in a first slot in the first subframe, and
the uplink power control unit applies the second correction value and does not apply the first correction value to the transmit power for the sPUSCH in the first subframe in the first serving cell.

8. A method comprising the steps of:

receiving a Downlink Control Information (DCI) format including a Transmission Power Control (TPC) command;

transmitting, in a case that a first DCI format is detected in a subframe n, a Physical Uplink Shared Channel (PUSCH) corresponding to the first DCI format in a subframe n+A;

transmitting, in a case that a second DCI format is detected in a subframe m, a shortened PUSCH (sPUSCH) corresponding to the second DCI format in a subframe m+B, the B being a smaller value than the A; and not applying a first correction value obtained from the TPC command included in the first DCI format to transmit power for the PUSCH and applying a second correction value obtained from the TPC command in the second DCI format to transmit power for the sPUSCH, in a case that the subframe m is later than the subframe n, that the subframe m+B for transmitting the sPUSCH is earlier than the subframe n+A for transmitting the PUSCH, and that a transmission subframe for the PUSCH and a transmission subframe for the sPUSCH belong to an identical uplink power control subframe set in a first serving cell.

* * * * *